United States Patent
Takeyoshi et al.

(10) Patent No.: US 9,203,718 B2
(45) Date of Patent: Dec. 1, 2015

(54) FRAME LOSS MEASUREMENT DEVICE, COMMUNICATION DEVICE, COMMUNICATION SYSTEM AND PERFORMANCE MEASUREMENT METHOD

(71) Applicant: FUJITSU LIMITED, Kawasaki-shi, Kanagawa (JP)

(72) Inventors: Haruyuki Takeyoshi, Tokorozawa (JP); Kanta Yamamoto, Kokubunnji (JP)

(73) Assignee: FUJITSU LIMITED, Kawasaki (JP)

( * ) Notice: Subject to any disclaimer, the term of this patent is extended or adjusted under 35 U.S.C. 154(b) by 109 days.

(21) Appl. No.: 13/910,200

(22) Filed: Jun. 5, 2013

(65) Prior Publication Data
US 2014/0022921 A1    Jan. 23, 2014

(30) Foreign Application Priority Data

Jul. 20, 2012   (JP) .................. 2012-161516

(51) Int. Cl.
*H04L 1/00*   (2006.01)
*H04L 12/26*   (2006.01)

(52) U.S. Cl.
CPC .................. *H04L 43/0829* (2013.01)

(58) Field of Classification Search
USPC ............. 370/235, 236, 241, 241.1, 242, 244, 370/250, 252
See application file for complete search history.

(56) References Cited

U.S. PATENT DOCUMENTS

| | | | |
|---|---|---|---|
| 8,229,705 B1* | 7/2012 | Mizrahi et al. ................ 702/182 |
| 2010/0020698 A1* | 1/2010 | Kondo ....................... 370/241.1 |
| 2011/0158112 A1* | 6/2011 | Finn et al. ...................... 370/252 |
| 2011/0243029 A1* | 10/2011 | Mack-Crane et al. ........ 370/253 |
| 2012/0076013 A1* | 3/2012 | Cheng ........................... 370/252 |
| 2013/0329565 A1* | 12/2013 | Holness et al. ............ 370/241.1 |

OTHER PUBLICATIONS

ITU-T G.8013/Y.1731, "OAM functions and mechanisms for Ethernet based networks" (Jul. 2011), pp. 1-81.

* cited by examiner

*Primary Examiner* — Frank Duong
(74) *Attorney, Agent, or Firm* — Fujitsu Patent Center

(57) ABSTRACT

A frame loss measurement device including a receiving unit which receives a measurement frame for measuring a communication path, a measurement unit which, based on the measurement frame received, measures performance of the communication path where the measurement frame is transmitted, and an allocation unit which secures resources of the frame loss measurement device to allocate to the measurement frame to be received.

7 Claims, 26 Drawing Sheets

FIG. 8

| MEASUREMENT ID | TRANSMITTING FRAME DATA |
|---|---|
| ID1 | INTRA-DEVICE COMMUNICATION DATA, MAC HEADER, VLAN TAG, type, SLR PDU, PADDING |
| ID2 | ... |
| . | . |
| . | . |

FIG. 9

| MEASUREMENT ID | TxFCf | TxFCb |
|---|---|---|
| ID1 | TxFCf[tp]1 | TxFCb[tp]1 |
| ID2 | TxFCf[tp]2 | TxFCb[tp]2 |
| . | . | . |
| . | . | . |

FIG. 10

| MEASUREMENT ID | INITIATING MEP-ID | RESPONDING MEP-ID | NUMBER OF FAR-END TRANSMITTING FRAMES | NUMBER OF NEAR-END FRAME LOSSES |
|---|---|---|---|---|
| ID1 | IMEP1 | RMEP1 | $\lvert TxFCf[tc]-TxFCf[tp] \rvert$ | $\lvert TxFCf[tc]-TxFCf[tp] \rvert$ $- \lvert TxFCb[tc]-TxFCb[tp] \rvert$ |
| . | . | . | . | . |
| . | . | . | . | . |

FIG. 11

| IF CARD NUMBER | TRANSMITTING IF FREE BAND | RECEIVING IF FREE BAND | MEASUREMENT FRAME STORAGE MEMORY FREE CAPACITY | STATISTIC INFORMATION STORAGE MEMORY FREE CAPACITY |
|---|---|---|---|---|
| IF1 | ○○bps | ○○bps | ○○Mbyte | ○○Mbyte |
| . | . | . | . | . |
| . | . | . | . | . |

FIG. 12

| MEASUREMENT ID | IF CARD NUMBER | TRANSMITTING IF USED BAND | RECEIVING IF USED BAND | MEASUREMENT FRAME STORAGE MEMORY USED CAPACITY | STATISTIC INFORMATION STORAGE MEMORY USED CAPACITY |
|---|---|---|---|---|---|
| ID1 | IF1 | ○○bps | ○○bps | ○○byte | ○○Mbyte |
| · | · | · | · | · | · |
| · | · | · | · | · | · |

FIG. 14

| SESSION ID | TRANSMITTING FRAME DATA |
|---|---|
| SID1 | INTRA-DEVICE COMMUNICATION DATA, MAC HEADER, VLAN TAG, type, SLM PDU, PADDING |
| SID2 | ... |
| . | . |
| . | . |

FIG. 15

| SESSION ID | TxFCf | TxFCb | RxFCl |
|---|---|---|---|
| SID1 | TxFCf[tp]1 | TxFCb[tp]1 | RxFCl[tp]1 |
| SID2 | TxFCf[tp]2 | TxFCb[tp]2 | RxFCl[tp]2 |
| . | . | . | . |
| . | . | . | . |

FIG. 16

| SESSION ID | INITIATING MEP-ID | RESPONDING MEP-ID | NUMBER OF NEAR-END TRANSMITTING FRAMES | NUMBER OF FAR-END FRAME LOSSES | |
|---|---|---|---|---|---|
| SID1 | IMEP1 | RMEP1 | \|TxFCf[tc]−TxFCf[tp]\| | \|TxFCf[tc]−TxFCf[tp]\|<br>−\|TxFCb[tc]−TxFCb[tp]\| | |
| . | . | . | . | . | |
| . | . | . | . | . | |

| NUMBER OF FAR-END TRANSMITTING FRAMES | NUMBER OF NEAR-END FRAME LOSSES | | |
|---|---|---|---|
| \|TxFCb[tc]−TxFCb[tp]\| | \|TxFCb[tc]−TxFCb[tp]\|<br>−\|RxFCl[tc]−RxFCl[tp]\| | | |
| . | . | | |
| . | . | | |

FIG. 17

| INITIATING MEP-ID | MEASUREMENT START TIME | INITIATING MEP-ID | NUMBER OF SLMS TRANSMITTED | NUMBER OF SLRS TRANSMITTED | NUMBER OF FAR-END FRAME LOSSES | NUMBER OF NEAR-END FRAME LOSSES | MEASUREMENT PERIOD (MINUTE) |
|---|---|---|---|---|---|---|---|
| IMEP1 | hh1:mm1:ss1 | RMEP1 | w1 | x1 | y1 | z1 | t1 |
| IMEP1 | hh2:mm2:ss2 | RMEP2 | w2 | x2 | y2 | z2 | t2 |
| IMEP1 | hh3:mm3:ss3 | RMEP3 | w3 | x3 | y3 | z3 | t3 |
| . | . | . | . | . | . | . | . |
| . | . | . | . | . | . | . | . |

FIG. 18

| SESSION ID | IF CARD NUMBER | TRANSMITTING IF USED BAND | RECEIVING IF USED BAND | MEASUREMENT FRAME STORAGE MEMORY USED CAPACITY | STATISTIC INFORMATION STORAGE MEMORY USED CAPACITY |
|---|---|---|---|---|---|
| SID1 | IF1 | ○○bps | ○○bps | ○○byte | ○○Mbyte |
| · | · | · | · | · | · |
| · | · | · | · | · | · |

FRAME LOSS MEASUREMENT DEVICE, COMMUNICATION DEVICE, COMMUNICATION SYSTEM AND PERFORMANCE MEASUREMENT METHOD

CROSS-REFERENCE TO RELATED APPLICATIONS

This application is based upon and claims the benefit of priority of the prior Japanese Patent Application No. 2012-161516, filed on Jul. 20, 2012, the entire contents of which are incorporated herein by reference.

FIELD

The embodiments discussed herein are related to communication path performance measurement using measurement frames.

BACKGROUND

Techniques for measuring the performance of a communication path by exchanging measurement frames between communication devices on a network are known. As an example of such techniques, there is Ethernet OAM (Operation Administration and Maintenance). FIG. 1 is a diagram illustrating a configuration to perform failure monitoring of a layer 2 network using ITU-T (International Telecommunication Union Telecommunication Standardization Sector) recommendation G. 8013/Y. 1731 OAM.

As depicted in FIG. 1, it is possible to monitor a failure to match the management segments of the network by dividing the layer 2 network monitoring period into units such as units between customer points, units of certain periods in the provider network, and/or the like. In Ethernet OAM, for every MEG (Maintenance Entity Group), which is the monitoring target group of the layer 2 network, the communication device at the end point in the MEG is set as the MEP (MEG end point). Furthermore, in the monitoring period, communication devices of intermediate monitoring points are set as MIPs (MEG Intermediate Points). The initiating MEP is the entity to initiate measurement, and a responding MEP is an entity to give a reply in response to a request message from the initiating MEP by a responding message. Such entities exist in VLAN (Virtual Local Area Network) units. Between MEPs, VLAN path normality check, performance measurement to measure the frame loss, frame delay and/or the like of each VLAN path, and/or the like are performed.

As one means for measuring frame loss using Ethernet OAM, ETH-SLM (Ethernet Synthetic Loss Measurement function) is defined in ITU-T recommendation G. 8013/Y. 1731. In ETH-SLM, when frame loss is measured, a request message is transmitted from a given MEP. The request message will be hereinafter referred to as "SLM" (Synthetic Loss Message). An MEP having received the SLM returns a response message. The response message will be hereinafter referred to as "SLR" (Synthetic Loss Reply). The transmission source MEP of SLMs calculates the number of frame losses from the number of SLMs transmitted and the number of SLRs received. Frame loss measured in this way is used to indicate the quality of the communication path. The communication provider is able to reflect the quality of the communication path on the billing system and provide services to match the quality of the communication path, to end-user.

Related art is disclosed in ITU-T G.8013/Y.1731, "OAM functions and mechanisms for Ethernet based networks", June 2011.

SUMMARY

In accordance with an aspect of the apparatus, there is provided a frame loss measurement device. The frame loss measurement device includes a receiver configured to receive a measurement frame for measuring a communication path, and a processor configured to measure performance of the communication path where the measurement frame is transmitted based on the measurement frame received. The processor secures resources of the frame loss measurement device to allocate to the measurement frame to be received.

In accordance with another aspect of the apparatus, there is provided a communication device. The communication device includes a receiver configured to receive a measurement frame for measuring a communication path from an opposing device, a processor configured to secure the resources of the communication device to allocate to the measurement frame to be received. The receiver receives from the opposing device, a resource securing request signal to request to secure resources of the communication device to allocate to the measurement frame to be received in the communication device. The processor reports an allocation result of the resources to the opposing device.

In accordance with another aspect of the apparatus, there is provided a communication system including a frame loss measurement device, an opposing device, and a control device which controls a measurement operation of performance of a communication path between the frame loss measurement device and the opposing device. The opposing device includes a first receiver which receives a measurement frame for measuring the communication path from the frame loss measurement device, a second receiver configured to receive, from the control device, a signal to make the opposing device to secure resources of the opposing device to allocate to the measurement frame to be received in the opposing device, a processor configured to secure the resources of the opposing device to be used to receive the measurement frame, and a transmitter configured to report an allocation result of the resources to the control device.

In accordance with an aspect of the method, there is provided a performance measurement method for measuring performance of a communication path between a frame loss measurement device and an opposing device. The method includes securing resources of the frame loss measurement device to allocate to a measurement frame to be transmitted from the opposing device to the frame loss measurement device via the communication path, and measuring the performance of the communication path between the frame loss measurement device and the opposing device, based on the measurement frame received in the frame loss measurement device.

In accordance with another aspect of the method, there is provided a performance measurement method for measuring performance of a communication path between a communication device and an opposing device. The method includes receiving, from the opposing device, a resource securing request signal to request to secure resources of the communication device to allocate to a measurement frame to be transmitted from the opposing device to the communication device via the communication path, securing the resources of the communication device to allocate to the measurement frame, and reporting an allocation result of the resources from the communication device to the opposing device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 8 is a diagram depicting an example of a measurement frame storage table in an opposing device.

FIG. 9 is a diagram depicting an example of a counter table in an opposing device.

FIG. 10 is a diagram depicting an example of a statistic information table in an opposing device.

FIG. 11 is a diagram depicting an example of a free resource table.

FIG. 12 is a diagram depicting an example of a used resource table in a responding MEP.

FIG. 14 is a diagram depicting an example of a measurement frame storage table in a communication device.

FIG. 15 is a diagram depicting an example of a counter table in a communication device.

FIG. 16 is a diagram depicting an example of a statistic information table in a communication device.

FIG. 17 is a diagram depicting an example of measurement result history to be stored in a communication device database.

FIG. 18 is a diagram depicting an example of a used resource table in a communication device.

DESCRIPTION OF EMBODIMENTS

When measurement frame loss occurs in a communication device, the influence of the measurement frame loss in the communication device is reflected on the measurement result, and, by this means, measurement error of communication path performance occurs. Measurement frame loss in a communication device might occur due to, for example, congestion of the measurement frame receiving process in the communication device, and/or the like.

Figure 1:
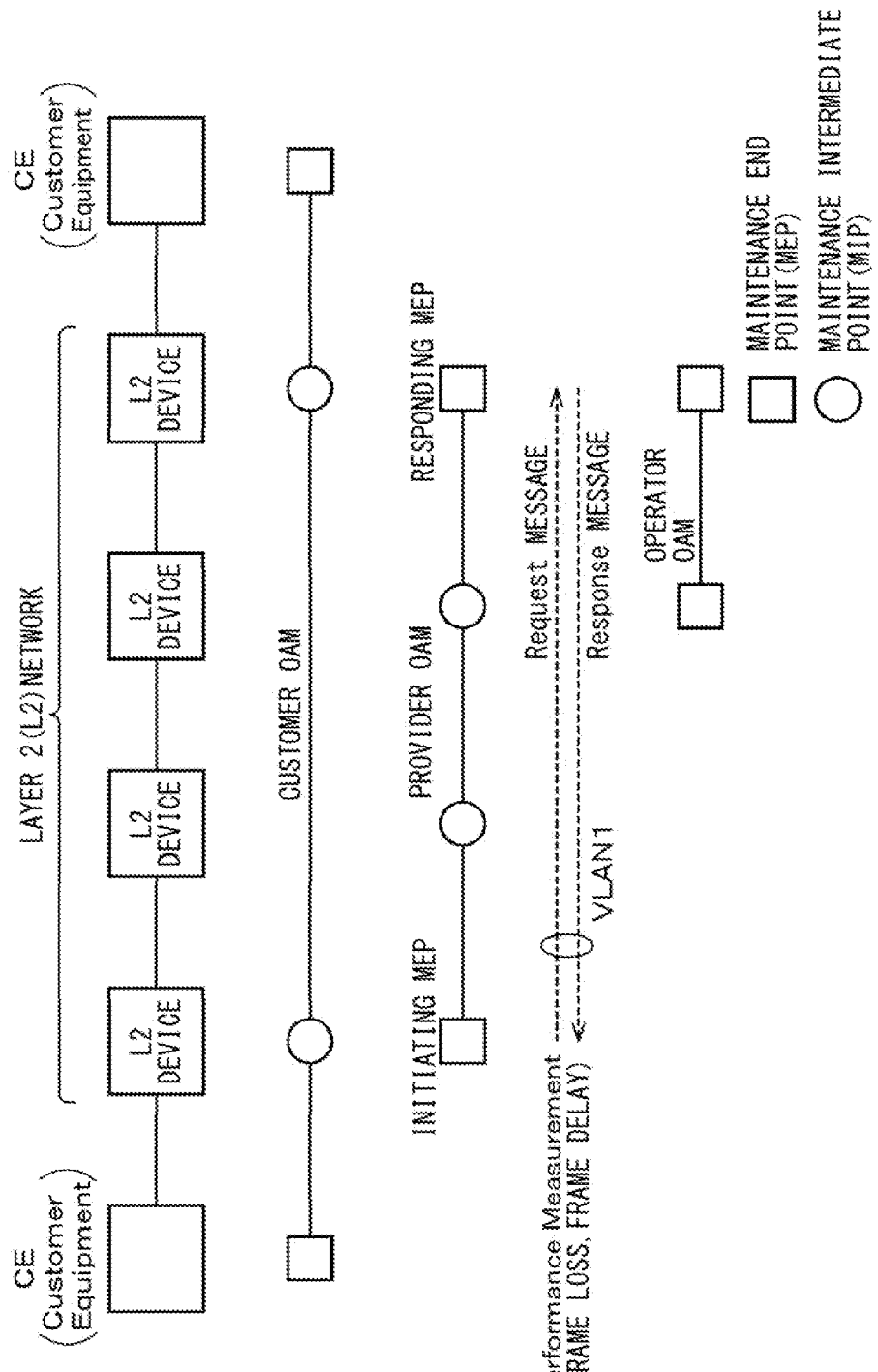
FIG. 1 is a diagram to illustrate a configuration to perform failure monitoring of a layer 2 network.
Figure 2:
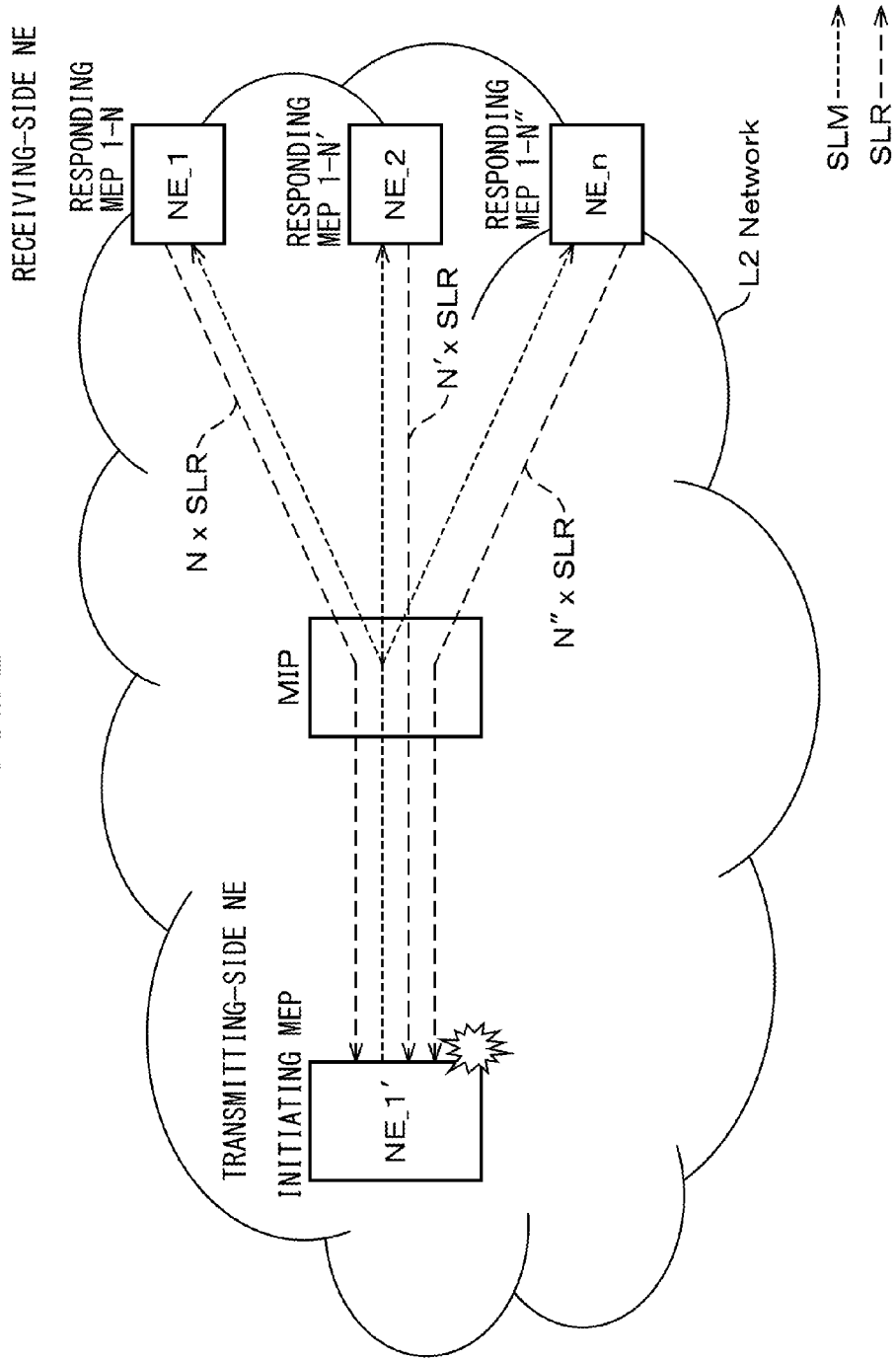
FIG. 2 is a diagram illustrating an example of an embodiment where measurement frame loss occurs.

As an example of an embodiment where measurement frame loss occurs, such a case may be conceived as the initiating MEP transmits SLMs to a plurality of responding MEPs using a multi-cast address. FIG. 2 is a diagram illustrating an example of an embodiment where measurement frame loss occurs. For one SLM, the initiating MEP receives SLRs for the responding MEPs every time. When the SLM transmission rate from the initiating MEP is high, the frame size is large and/or the number of responding MEPs is large, there is a possibility that congestion of the SLR receiving process might occur in the transmitting-side NE (Network Element). When the SLR receiving process is congested, SLR frame loss might occur in the transmitting-side NE, due to, for example, receipt of SLRs to exceed the maximum allowable band of the interface to transmit SLRs.

The device and method disclosed herein have an object of eliminating measurement error of communication path performance due to measurement frame loss in communication devices.

1. First Embodiment 1.1 System Configuration Example

Figure 3:
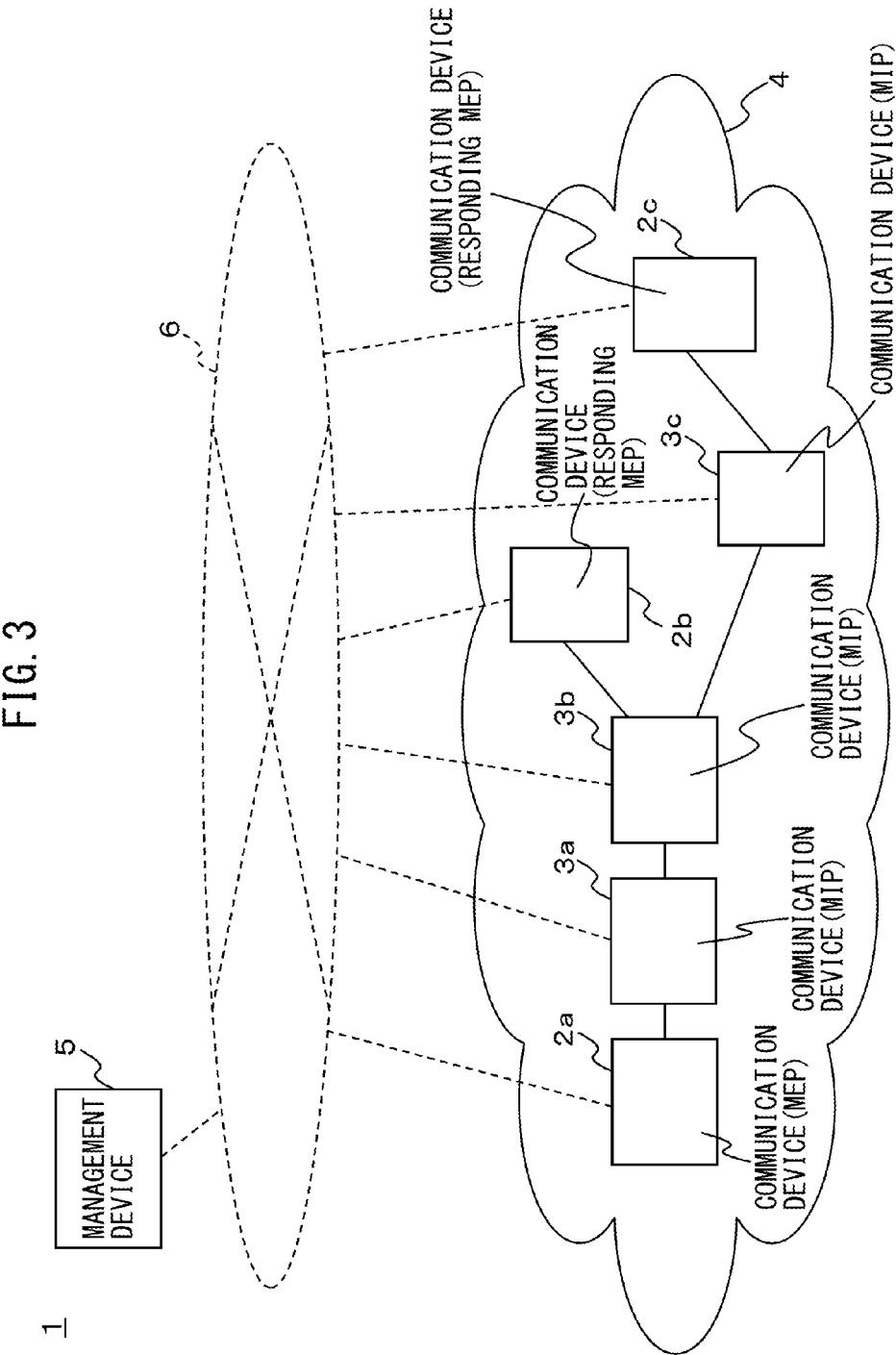
FIG. 3 is a diagram depicting an example of an overall configuration of a communication system.

Now, preferred embodiments will be illustrated below with reference to the accompanying drawings. FIG. 3 is a diagram depicting an example of an overall configuration of a communication system. A communication system 1 includes a network 4, which is formed with communication devices 2a to 2c and 3a to 3c for communicating frames, a management device 5, and a maintenance network 6. The management device 5 is an information processing device which monitors the state of and controls the communication devices 2a to 2c and 3a to 3c, and is connected to the communication device 2a to 2c and 3a to 3c, via the maintenance network 6.

The communication system 1 will be illustrated using an example of frame loss measurement by ITU-T Y.1731 ETH-SLM. However, the device and method disclosed herein are applicable to communication systems of other schemes as well, as long as such other schemes are communication systems to perform communication path performance measurement by exchanging frames and/or the like between communication devices, between predetermined points such as MEPs, and/or the like. Furthermore, the device and method disclosed herein are applicable to communication path performance measurement other than measurement of frame loss, such as measurement of the amount of frame delay.

The following description will focus on a measurement session in which the communication device 2a operates as an initiating MEP and the communication devices 2b and 2c operate as responding MEPs. In a given measurement session, the communication device 2b and 2c to transmit an SLR to the communication device 2a in response to an SLM from the communication device 2a will be referred to as "opposing devices." The SLM and SLR are examples of a request frame and a measurement frame, respectively. Furthermore, the communication device 2a is an example of a frame loss measurement device. The opposing devices 2b and 2c may be collectively referred to as "opposing devices 2".

In addition, in the measurement session, the communication device 3a and 3b at intermediate points in the monitoring period between the communication device 2a and the opposing device 2b operate as MIPs. Furthermore, the communication devices 3a to 3c at intermediate points in the monitoring period between the communication device 2a and the opposing devices 2c operate as MIPs. The communication devices 3a to 3c may be collectively referred to as "communication devices 3".

1.2 Frame Loss Measurement Operation

Figure 4:
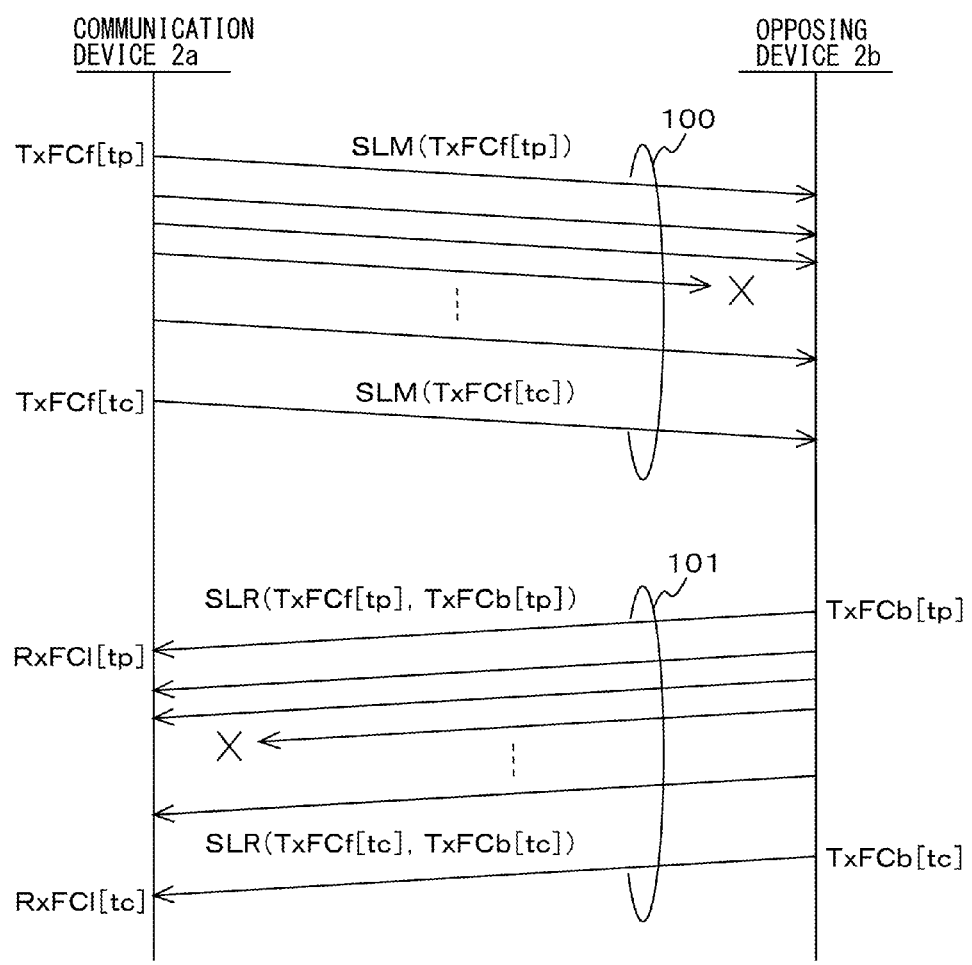
FIG. 4 is a diagram illustrating an example of a frame loss measurement operation.

An example of a frame loss measurement operation between the communication device 2a and the opposing device 2b will be illustrated with reference to FIG. 4. The reference code 100 indicates SLM transmission by the communication device 2a, and the reference code 101 indicates SLR transmission by the opposing device 2b. The communication device 2a transmits an SLM a plurality of times, and counts the number of times at which an SLM is transmitted. In each SLM, the count of SLM transmissions TxFCf(t) by the communication device 2a at respective transmission time point t is stored. "TxFCf(tp)" and "TxFCf(tc)" represent the counts of SLM transmissions at the measurement start time tp and at the measurement end time tc.

Every time the opposing device 2b receives one SLM, the opposing device 2b transmits one SLR and counts the number of times at which an SLR has been transmitted. In each SLR, the count of SLM transmissions TxFCf(t) stored in the received SLM, and the count of SLR transmissions TxFCb(t) in the opposing device 2b, are stored. "TxFCb(tp)" and "TxFCb(tc)" indicate the counts of SLR transmissions corresponding to TxFCf[tp] and TxFCf[tc], respectively.

The communication device 2a calculates the number of far-end frame losses, which is the number of received frame losses in the opposing device 2b, and the number of near-end frame losses, which is the number of received frame losses in the communication device 2a, by the following equations:

The number of far-end frame losses=|TxFCf(tc)−TxFCf(tp)|−|TxFCb(tc)|TxFCb(tp)|

The number of near-end frame losses=|TxFCb(tc)−TxFCb(tp)|−|RxFCl(tc)−RxFCl(tp)|

Here, RxFCl(tp) and RxFCl(tc) indicate the counts of SLRs received in the communication device 2a, corresponding to TxFCf[tp] and TxFCf[tc], respectively. The communication device 2a calculates the frame loss ratio as communication path performance, based on the numbers of frame losses calculated. As described above, the frame loss ratio is used to calculate the performance of the transmission path. In other words, when the number of received frames is miscalculated, the impact on the measurement result of the performance of the communication path is significant, and therefore it is necessary to calculate the number of frames lost over the communication path accurately.

1.3 Hardware Configuration Example

Next, an example of a hardware configuration of the communication device 2a will be illustrated with reference to FIG. 5. The hardware configurations of the opposing devices 2b and 2c and the communication devices 3a to 3c may be the same. The communication device 2a includes a control card 10, line interface cards 20-1 to 20-n, and a packet switch card 30. In the following description and accompanying drawings, an interface may be referred to as "IF". The network IF cards 20-1 to 20-n may be collectively referred to as "line IF cards 20".

The control card 10 includes a processor 11 for signal processing to control the entire communication device. The memory 12 stores a control program for the signal processing by the processor 11 and data that is used while the program is executed. The memory 12 may include a non-volatile storage device, a read-only memory (ROM), a random access memory (RAM), and/or the like, for storing computer programs and data.

The control card 10 includes an LSI (Large Scale Integration) 13, which operates as a physical communication interface between the control card 10 and the line IF cards 20. The LSI 13 may be, for example, an ASIC (Application Specific Integrated Circuit) or an FPGA (Field-Programming Gate Array). The control card 10 collects data from the line IF cards 20 via the LSI 13 and manages the state of the line IF cards 20. The LSI 13 is used as a physical interface for allowing the user to monitor the state of OAM, input setting information by a command line IF, and/or the like. Furthermore, the LSI 13 is also used as a communication interface with the management device 5.

The line IF card 20 is an input/output interface for layer 2 traffic that is communicated on the network 4. The line IF card 20 includes a physical IF 21, a network processor 22, a traffic manager 23, and a line IF card control circuit 24. In the following description and accompanying drawings, the physical IF 21, the network processor 22 and the traffic manager 23 may be referred to as "PHY 21", "NPU 22" and "TM 23", respectively.

The PHY 21 has a physical optical signal input/output terminal, and converts an optical signal that received into an electric signal, and inputs the optical signal in the NPU 22. Furthermore, transmission data that is output from the NPU 22 is converted into an optical signal and transmitted to the network 4. The NPU 22 performs signal processing for transmitting and receiving frames. In other words, the NPU 22 also performs signal processing for transmitting and receiving measurement frames that are input from the communication path. The TM 23 performs queuing and band control according to the priority that is determined per frame. When the performance of the communication path is measured, it is necessary to make the evaluation based on the number of measurement frames lost (over the communication path) until the input in the network card IF (or port) is done.

The line IF card control circuit 24 generates, transmits and receives the control frames used to control the frame communication in the network 4, and performs signal processing based on the received frames. SLMs and SLRs, which are measurement frames to measure the performance of the communication path of the network 4, are examples of control frames. The line IF card control circuit 24 includes an FPGA 26 and a memory 27.

The FPGA 26 performs SLM and SLR count processes, performs a frame loss calculation process based on the count results, and/or the like. The memory 27 stores a measurement frame storage table, which stores measurement frames used when measuring the frame loss, a counter table, which stores the count values of SLMs and SLRs, and a statistic information table, which stores the frame loss calculation result. In this way, in the communication device, frame loss is calculated not soon after input from the communication path, but is calculated by the FPGA 27 after storage in the memory 27. When a measurement frame is lost after the measurement frame is input in the communication device and before the frame loss calculation is finished, it is clear that there is an impact on the calculation result.

The NPU 22 inserts the control frames generated by the line IF card control circuit 24 between transmitting frames.

The reference code 25 is a transmitting IF, which transmits the control frames from the line IF card control circuit 24 to the NPU 22. Furthermore, the NPU 22 extracts the control frames from the received frames and outputs the control frames to the line IF card control circuit 24. The reference code 26 is a receiving IF, whereby the line IF card control circuit 24 receives the control frames from the NPU 22.

The NPU 22 executes a measurement frame filtering process to switch the measurement frame transfer process between the NPU 22 and the line IF card control circuit 24 to be valid and to be invalid, when frame loss measurement is started and when the measurement is finished. In other words, when the measurement frame filtering process is valid, measurement frames are transferred between the NPU 22 and the line IF card control circuit 24. In this way, with the present embodiment, by securing the reference code 26 and the line IF card control circuit 24 as resources to be occupied by measurement frames, it is possible to prevent frame loss due to congestion.

The packet switch card 30 switches layer 2 traffic between the line IF cards based on layer 2 traffic transfer destination information per VLAN (Virtual Local Area Network) ID, stored in the control card 10.

Figure 5:
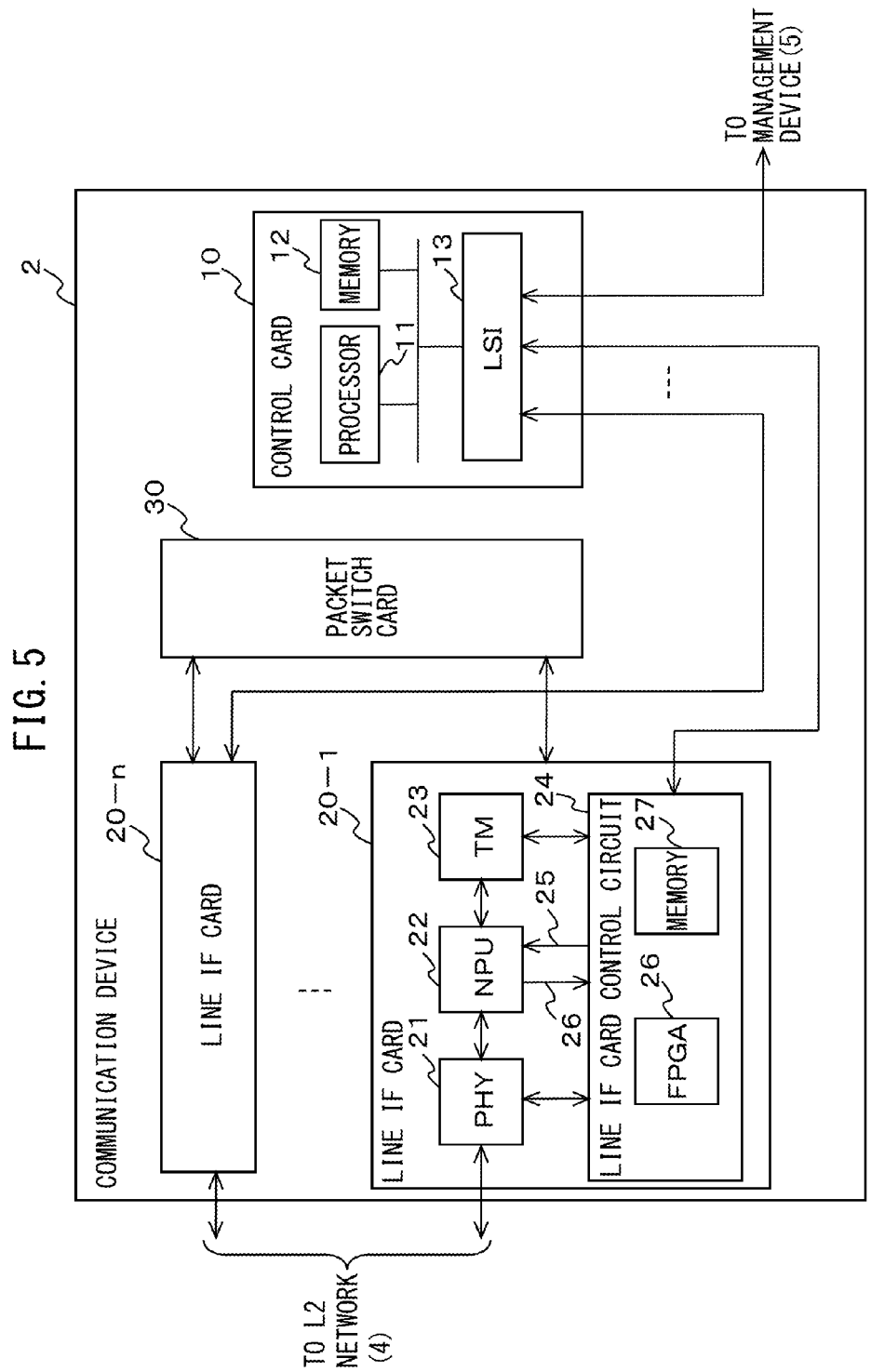
FIG. 5 is a diagram illustrating an example of a hardware configuration of a communication device.

Note that the hardware configuration depicted in FIG. 5 is only an example for illustrating an embodiment. As long as the operations described below are executed, the communication device 2a described herein may employ any other hardware configurations.

1.4 Functional Configuration of Opposing Device

Figure 6:
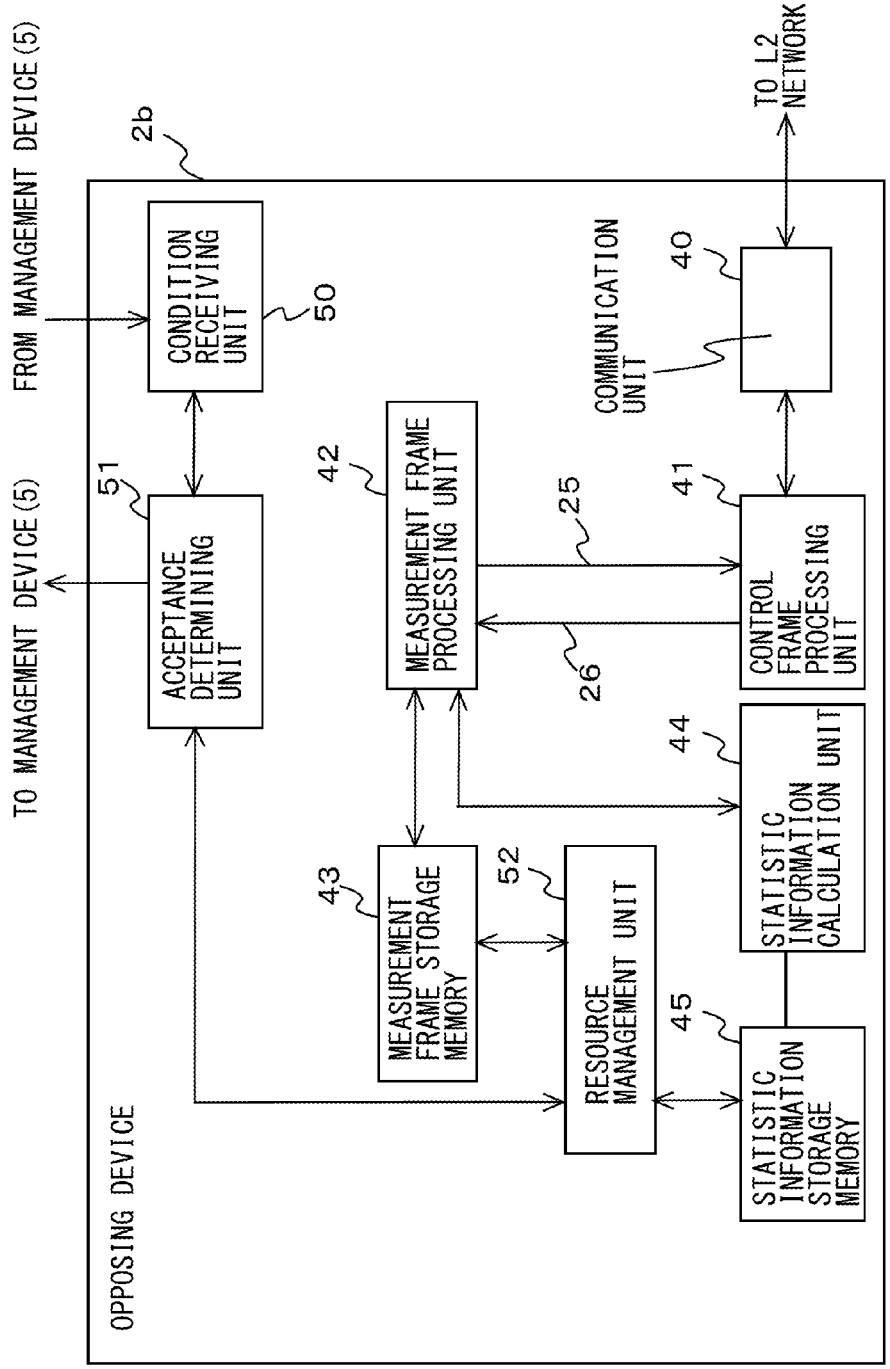
FIG. 6 is a diagram depicting the first example of a functional configuration of an opposing device.

Next, functions realized by the above hardware configuration will be illustrated. FIG. 6 is a diagram depicting the first example of a functional configuration of the opposing device 2b. The opposing device 2c may have the same functional configuration. Note that the functional configuration diagram of FIG. 6 primarily depicts configurations that relate to the functions to be described below herein, with respect to the opposing device 2b. The opposing device 2b may include other configuration components than those depicted in the drawing. The same applies to the functional configuration diagrams of FIG. 13 and FIG. 25.

The opposing device 2b includes a communication unit 40, a control frame processing unit 41, a measurement frame processing unit 42, a measurement frame storage memory 43, a statistic information calculation unit 44, and a statistic information storage memory 45. The opposing device 2b includes a condition receiving unit 50, an acceptance determining unit 51, and a resource management unit 52.

Figure 7:
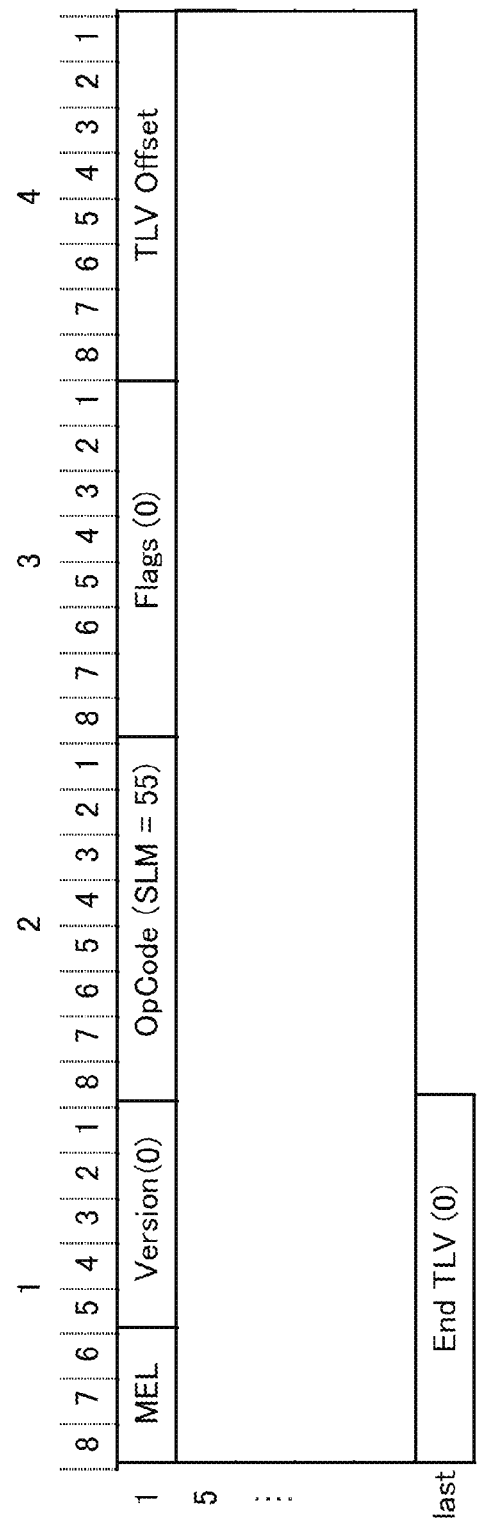
FIG. 7 is a diagram illustrating an example of a frame configuration.

The communication unit 40 performs frame transmitting/receiving processes in the opposing device 2b. The control frame processing unit 41 extracts an SLM that is transmitted from the communication device 2a, from a frame received in the communication unit 40, and outputs the SLM to the measurement frame processing unit 42. FIG. 7 illustrates a configuration of an OAM PDU (Protocol Data Unit), which is an example of a frame to be received in the communication unit 40. The control frame processing unit 41 monitors the "OpCode" field and extracts frames of which "OpCode" field value is "55" which is the predetermined value to appoint an SLM. Furthermore, the control frame processing unit 41 inserts SLRs generated by the measurement frame processing unit 42, between transmitting frames.

Every time the measurement frame processing unit 42 receives one SLM from the communication device 2a, the measurement frame processing unit 42 generates one SLR, and outputs the SLR to the control frame processing unit 41.

At this time, the measurement frame processing unit 42 designates a predetermined value "54," which designates an SLR, as the value of the "OpCode" field of the OAM PDU of the SLR. The measurement frame storage memory 43 stores a measurement frame storage table, which stores information that is used to generate SLRs on a per measurement session basis.

FIG. 8 is a diagram depicting an example of a measurement frame storage table in the opposing device 2b. The measurement frame storage table includes the information elements "measurement ID" and "transmitting frame data". The measurement IDs are the identifiers of measurement sessions, assigned on a per measurement session basis, by the opposing device 2b. The transmitting frame data include information to be used to generate the SLRs transmitted at each measurement session.

The transmitting frame data may also include, for example, intra-device communication data, a MAC (Media Access Control) header, a VLAN tag, a type, an SLR PDU and padding. The intra-device communication data is data to be used to transfer SLRs in the opposing device 2b. The MAC header and the VLAN tag are a MAC header and a VLAN tag that are attached to frames transmitted at measurement sessions. The type is the designated value of the type field of frames transmitted at measurement sessions. The SLR PDU is an SLR PDU to store in frames transmitted at measurement sessions.

Reference will be made to FIG. 6. When having transmitted an SLR, the measurement frame processing unit 42 counts the number of time at which an SLR has been transmitted. The measurement frame processing unit 42 stores in a counter table the count of SLR transmissions TxFCb[tp] when frame loss measurement is started, and the count of SLM transmissions TxFCf[tp] stored in the SLM that is transmitted from the communication device 2a when frame loss measurement is started.

FIG. 9 is a diagram illustrating an example of a counter table in the opposing device 2b. The counter table includes the information elements "measurement ID," "TxFCf" and "TxFCb." The measurement IDs are the identifiers of measurement sessions, assigned on a per measurement session basis, in the opposing device 2b. TxFCf is the count of SLM transmissions TxFCf[tp] stored in the SLM that is transmitted from the communication device 2a when frame loss measurement is started. TxFCb is the count of SLR transmissions TxFCb[tp] when frame loss measurement is started.

Reference will be made to FIG. 6. When frame loss measurement is finished, the statistic information calculation unit 44 calculates "the number of far-end transmitting frames" which is the number of transmitting frames transmitted from the communication device 2a, and "the number of near-end frame losses" which is the number of frame losses of received frames in the opposing device 2b. The statistic information storage memory 45 stores a statistic information table, which stores the number of far-end transmitting frames and the number of near-end frame losses.

FIG. 10 is a diagram depicting an example of a statistic information table in the opposing device 2b. The statistic information table includes "measurement ID", "initiating MEP-ID", "responding MEP-ID", "the number of far-end transmitting frames" and "the number of near-end frame losses." The measurement IDs are the identifiers of measurement sessions, assigned on a per measurement session basis, in the opposing device 2b. The initiating MEP-ID and responding MEP-IDs are the identifiers of the initiating MEP and responding MEPs in each measurement session. The number of far-end transmitting frames is the number of transmitting frames, |TxFCf[tc]−TxFCf[tp]|, transmitted by the communication device 2a in each measurement session. The number of near-end frame losses is the number of received frame losses, |TxFCf[tc]−TxFCf[tp]|−|TxFCb[tc]−TxFCb[tp]|, in the opposing device 2b in each measurement session.

Reference will be made to FIG. 6. When frame loss measurement is started, the condition receiving unit 50 receives the conditions of measurement of the frame loss measurement which is going to start, from the management device 5. The conditions of measurement may include, for example, the amount of band used for SLMs in the receiving IF 26, and the amount of band used for SLRs in the transmitting IF 25. For example, the conditions of measurement may include the SLM and SLR transmission intervals, the SLM and SLR frame sizes. Furthermore, the conditions of measurement may also include the amount of memory used for frame loss measurement.

When the condition receiving unit 50 receives the conditions of measurement, the acceptance determining unit 51 makes reference to the resource management unit 52 for the amount of free resources in the transmitting IF 25, the receiving IF 26, the measurement frame storage memory 43 and the statistic information storage memory 45. The resource management unit 52 references a free resource table, in which the amounts of free resources in the transmitting IF 25, the receiving IF 26, the measurement frame storage memory 43 and the statistic information storage memory 45, are stored. FIG. 11 is a diagram depicting an example of a free resource table.

The free resource table includes the information elements "IF card number", "transmitting IF free band", "receiving IF free band", "measurement frame storage memory free capacity" and "statistic information storage memory free capacity". The IF card numbers are the identification numbers to identify the line IF cards 20-1 to 20-n respectively. The transmitting IF free band and the receiving IF free band are the free bands of the transmitting IF 25 and the receiving IF 26 of each line IF card 20 respectively. The measurement frame storage memory free capacity and the statistic information storage memory free capacity are the free capacities of the measurement frame storage memory 43 and the statistic information storage memory 45 of each line IF card 20 respectively.

The resource management unit 52 determines whether or not the resources designated by the conditions of measurement can be secured from the free resources of the line IF card 20 used for measurement session. When the resources can be secured, the resource management unit 52 secures the resources designated by the conditions of measurement. When securing the resources, the resource management unit 52 reduces the amount of free resources stored in the free resource table by such an amount for each resource as designated by the conditions of measurement.

Furthermore, the resource management unit 52 stores the amount of resources secured for each measurement session in a used resource table. FIG. 12 is a diagram depicting an example of a used resource table. The used resource table includes the information elements "measurement ID", "IF card number", "transmitting IF used band", "receiving IF used band", "measurement frame storage memory used capacity" and "statistic information storage memory used capacity."

The measurement IDs are the identifiers of measurement sessions, assigned on a per measurement session basis, in the opposing device 2b. The IF card number is the identification number of the line IF card 20, used in each measurement session. The transmitting IF used band and the receiving IF used band are the used bands of the transmitting IF 25 and the receiving IF 26, used in each measurement session. The measurement frame storage memory used capacity and the statistic information storage memory used capacity are the amounts of the measurement frame storage memory 43 and statistic information storage memory 45 used, in each measurement session.

Reference will be made to FIG. 6. When the resource management unit 52 is able to secure resources, the acceptance determining unit 51 determines that frame loss measurement complying with the conditions of measurement is possible. In this case, the acceptance determining unit 51 transmits an acceptance-possible notice, which indicates that frame loss measurement can be accepted, to the management device 5. When the resource management unit 52 is unable to secure resources, the acceptance determining unit 51 determines that frame loss measurement complying with the conditions of measurement is not possible. At this time, the acceptance determining unit 51 transmits an acceptance-not-possible notice, which indicates that frame loss measurement is not to be accepted, to the management device 5.

Note that the above operations of the communication unit 40 are realized by the cooperation of the PHY 21, the NPU 22 and the TM 23, as depicted in FIG. 5. The above operation of the control frame processing unit 41 is executed by the NPU 22. The above operations of the measurement frame processing unit 42 and the statistic information calculation unit 44 are executed by the FPGA 26. The above operation of the condition receiving unit 50 is executed by the processor 11 and the LSI 13. The operations of the acceptance determining unit 51 and the resource management unit 52 are executed by the processor 11.

The memory areas of the measurement frame storage memory 43, the statistic information storage memory 45, and the counter table are provided in the memory 27 of the line IF card control circuit 24. The memory areas of the free resource table and the used resource table are provided in the memory 12 of the control card 10.

1.5 Functional Configuration of Communication Device

Next, an example of a functional configuration of the communication device 2a will be illustrated with reference to FIG. 13. The communication device 2a includes a communication unit 60, a control frame processing unit 61, a measurement frame processing unit 62, a measurement session management unit 63, a measurement frame storage memory 64, a statistic information calculation unit 65, a statistic information storage memory 66, and a measurement result database. The communication device 2a includes a condition receiving unit 70, an acceptance determining unit 71, and a resource management unit 72.

Note that, in the following description and accompanying drawings, a database may be referred to as "DB." Note also that the broken line 73 indicates the signal path from the measurement session management unit 63 to the acceptance determining unit 71, being used in another embodiment, which will be described later in "2. Second Embodiment". With the first embodiment, the signal path 73 may be omitted.

The communication unit 60 performs the frame transmitting/receiving processes in the communication device 2a. The control frame processing unit 61 inserts an SLM generated by the measurement frame processing unit 62, between transmitting frames. The control frame processing unit 61 extracts an SLR transmitted from the opposing device 2b, from a frame received in the communication unit 60, and outputs the SLR to the measurement frame processing unit 62.

When frame loss measurement is started, the measurement frame processing unit 62 generates an SLM a plurality of times and outputs the SLMs by turns to the control frame processing unit 61. The measurement frame storage memory 64 stores a measurement frame storage table, which stores information necessary to generate SLMs on a per measurement session basis.

FIG. 14 is a diagram depicting an example of a measurement frame storage table in the communication device 2a. The measurement frame storage table includes the information elements "session ID" and "transmitting frame data". The session ID is the identifier of each measurement session. The transmitting frame data includes information necessary to generate SLMs to transmit in each measurement session. The transmitting frame data may include, for example, intra-device communication data, a MAC header, a VLAN tag, a type, an SLM PDU and padding. The SLM PDU is an SLM PDU to be stored in frames transmitted in measurement sessions. Other information elements are the same as the information elements described above with reference to FIG. 8.

Figure 13:
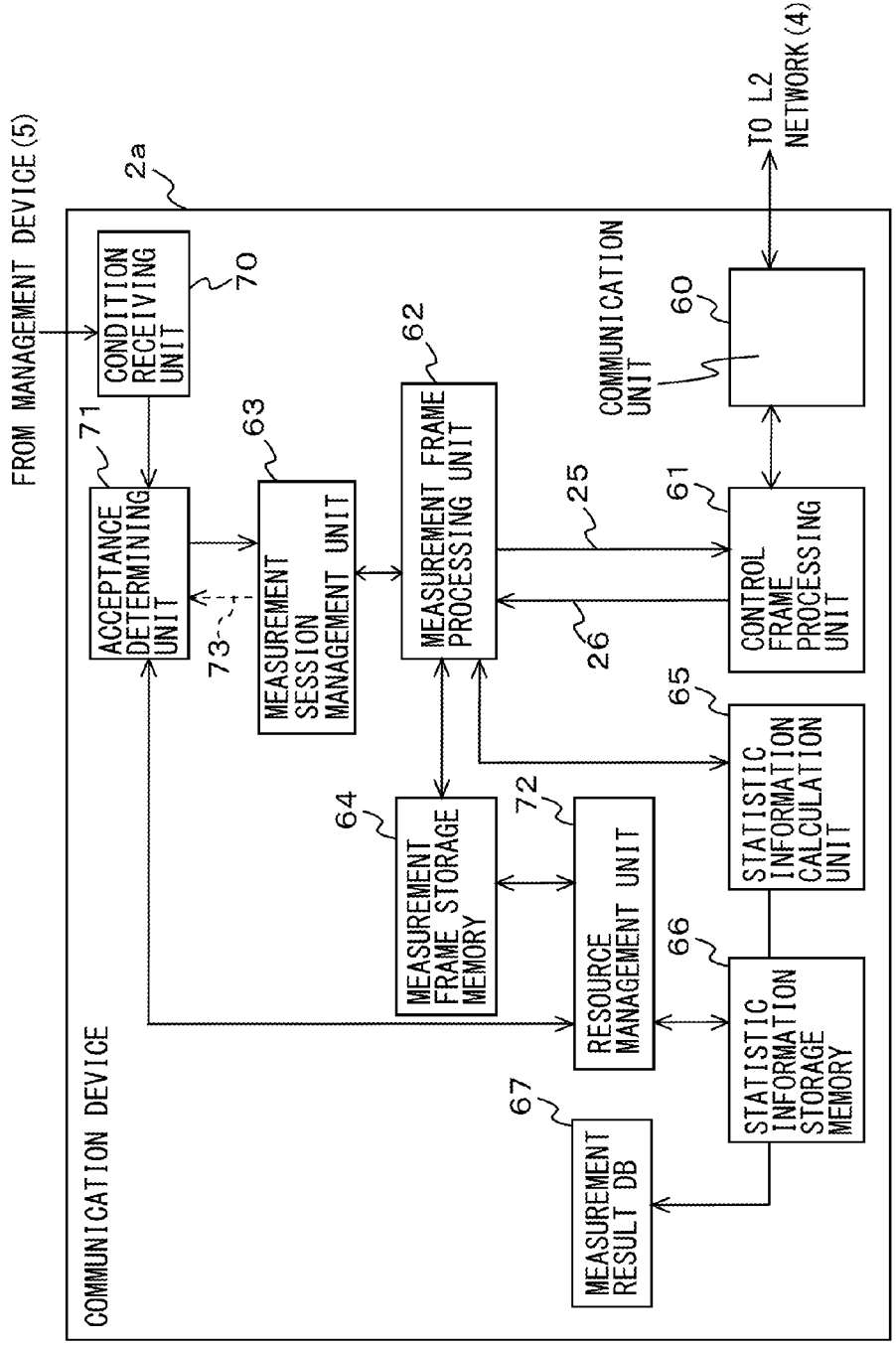
FIG. 13 is a diagram depicting an example of a functional configuration of a communication device.

Reference will be made to FIG. 13. When SLM transmission is started, the measurement frame processing unit 62 counts the number of times at which an SLM is transmitted. The measurement frame processing unit 42 stores the count of SLM transmissions TxFCf[tp] when frame loss measurement is started, in the counter table. Furthermore, when SLR reception from the opposing device 2b is started, the measurement frame processing unit 42 stores the count of SLR receptions RxFCl[tp] when the reception is started, and stores the count of SLR transmissions TxFCb[tp] stored in the SLR when the reception is started, in the counter table.

FIG. 15 is a diagram depicting an example of a counter table in the communication device 2a. The counter table includes the information elements "session ID", "TxFCf", "TxFCb" and "RxFCl". The session ID is the identifier of each measurement session. TxFCf is the count of SLM transmissions TxFCf[tp] when frame loss measurement is started. TxFCb is the count of SLR transmissions TxFCb[tp] stored in the SLR transmitted from the opposing device 2b when SLR transmission is started. RxFCl is the count of SLR receptions RxFCl[tp] at the time of SLR reception.

Reference will be made to FIG. 13. The measurement session management unit 63 controls the start and end of a measurement session. When frame loss measurement is finished, the statistic information calculation unit 65 calculates "the number of near-end transmitting frames" which is the number of transmitting frames transmitted from the communication device 2a, and "the number of far-end frame losses" which is the number of frame losses of received frames in the opposing device 2b. The statistic information calculation unit 65 calculates "the number of far-end transmitting frames" which is the number of transmitting frames transmitted from the opposing device 2b, and "the number of near-end frame losses" which is the number of frame losses of received frames in the communication device 2a. The statistic information storage memory 66 stores a statistic information table, which stores the number of near-end transmitting frames, the number of far-end frame losses, the number of far-end transmitting frames and the number of near-end frame losses.

FIG. 16 is a diagram depicting an example of a statistic information table in the communication device 2a. The statistic information table includes "session ID". "initiating MEP-ID", "responding MEP-ID", "the number of near-end transmitting frames", "the number of far-end frame losses", "the number of far-end transmitting frames" and "the number of near-end frame losses." The session ID is the identifier of each measurement session. The initiating MEP-ID and responding MEP-IDs are the identifiers of the initiating MEP and responding MEPs in each measurement session.

The number of near-end transmitting frames is the number of transmitting frames transmitted by the communication device 2a in each measurement session. The number of far-end frame losses is the number of received frame losses, |TxFCf[tc]−TxFCf[tp]|−|TxFCb[tc]−TxFCb[tp]|, in the opposing device 2b. The number of far-end transmitting frames is the number of transmitting frames transmitted by the opposing device 2b in each measurement session. The number of near-end frame losses is the number of received frame losses, |TxFCb[tc]−TxFCb[tp]|−|RxFCl[tc]−RxFCl[tp]|, in the communication device 2a.

Reference will be made to FIG. 13. The frame loss measurement result of each measurement session is stored in the statistic information table in each line IF card 20, but the control card 10 of the communication device 2a includes a measurement result DB 67, which stores the time-sequence history of measurement results. FIG. 17 is a diagram depicting an example of measurement result history to be stored in the measurement result DB 67.

The measurement result history includes the information elements "initiating MEP-ID", "measurement start time", "responding MEP-ID", "the number of SLMs transmitted", "the number of SLRs transmitted", "the number of far-end frame losses", "the number of near-end frame losses" and "measurement period (minute)." The initiating MEP-ID and responding MEP-IDs are the identifiers of the initiating MEP and responding MEPs in each measurement session. The measurement start time is the time when a measurement session is started. The number of SLMs transmitted and the number of SLRs transmitted are, respectively, the count of SLM transmissions |TxFCf[tc]−TxFCf[tp]| by the communication device 2a and the count of SLR transmissions |TxFCb[tc]−TxFCb[tp]| by the opposing device 2b. "The number of far-end frame losses" is the number of received frame losses |TxFCf[tc]−TxFCf[tp]|−|TxFCb[tc]−TxFCb[tp]| by the opposing device 2b. "The number of near-end frame losses" is the number of received frame losses |TxFCb[tc]−TxFCb[tp]|−|RxFCl [tc]−RxFCl [tp]| by the communication device 2a.

Reference will be made to FIG. 13. When frame loss measurement is started, the condition receiving unit 70 receives the conditions of measurement for the frame loss measurement from the management device 5. When the condition receiving unit 70 receives the conditions of measurement, the acceptance determining unit 71 makes reference to the resource management unit 72 whether or not the resources designated by the conditions of measurement can be secured from the amounts of free resources in the transmitting IF 25, the receiving IF 26, the measurement frame storage memory 64 and the statistic information storage memory 66.

The acceptance determining unit 71 determines whether or not frame loss measurement to comply with the conditions of measurement is possible, based on whether or not the resource management unit 72 is able to secure resources. The free resource determining process and the resource establishment process by the resource management unit 72 are the same as the processes by the resource management unit 52 of the opposing device 2b. The resource management unit 72 stores the amount of resources secured for each measurement session in the used resource table depicted in FIG. 18. The used resource table is the same as the used resource table depicted in FIG. 12 except that the measurement session identifier "session ID" is used instead of the information element "measurement ID" used in the opposing device 2b.

Reference will be made to FIG. 13. When the resource management unit 72 is able to secure resources, the measurement session management unit 63 starts a measurement session in accordance with the designated conditions of measurement. When the resource management unit 72 is unable to secure resources, the measurement session management unit 63 does not start a measurement session. The acceptance determining unit 51 may transmit an acceptance-not-possible notice, which indicates that the acceptance of frame loss measurement to comply with the conditions of measurement is not possible, to the management device 5.

The above operations of the communication unit 60 are executed by the cooperation of the PHY 21, the NPU 22 and the TM 23 depicted in FIG. 5. The above operation of the control frame processing unit 61 is executed by the NPU 22. The above operations of the measurement frame processing unit 62 and the statistic information calculation unit 65 are executed by the FPGA 26. The above operation of the condition receiving unit 70 is executed by the processor 11 and the LSI 13. The operations of the acceptance determining unit 71, the resource management unit 72 and the measurement session management unit 63 are executed by the processor 11.

The memory areas of the measurement frame storage memory 64, the statistic information storage memory 66 and the counter table are provided in the memory 27 of the line IF card control circuit 24. The memory areas of the free resource table, the used resource table and the measurement result DB 67 are provided in the memory 12 of the control card 10.

1.6 Frame Loss Measurement Initiating Operation

Figure 19:
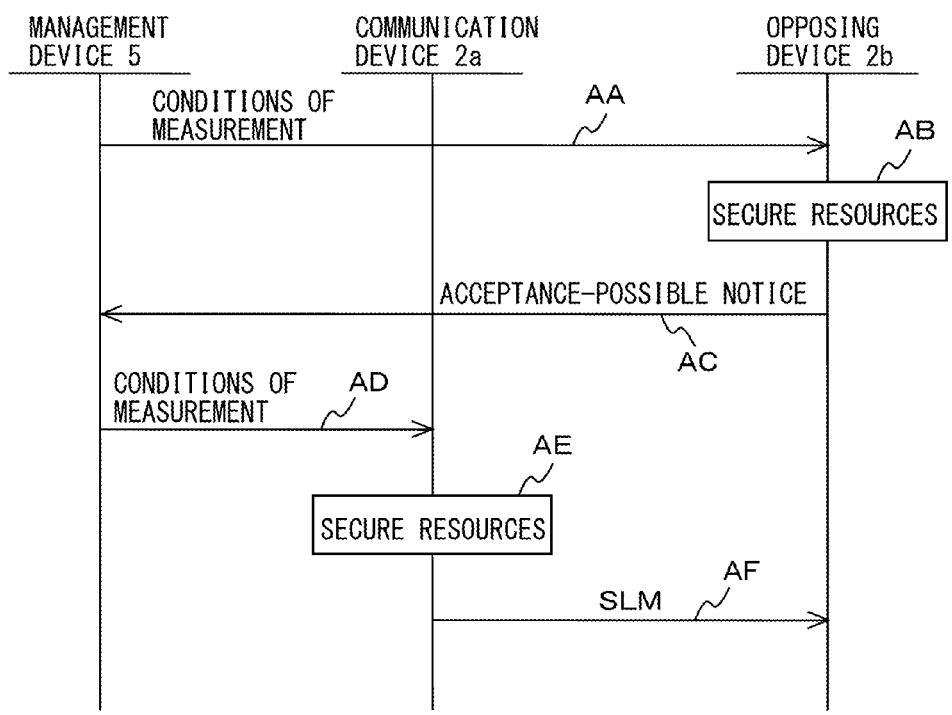
FIG. 19 a diagram illustrating the first example of a frame loss measurement initiating operation.

Next, the operations of the management device 5, the communication device 2a and the opposing device 2b when frame loss measurement is started, will be illustrated. FIG. 19 is a diagram illustrating the first example of a frame loss measurement initiating operation. A series of operations illustrated with reference to FIG. 19 may be interpreted as a method to include a plurality of steps. In this case, "operation" may be read as "step."

Figure 20:
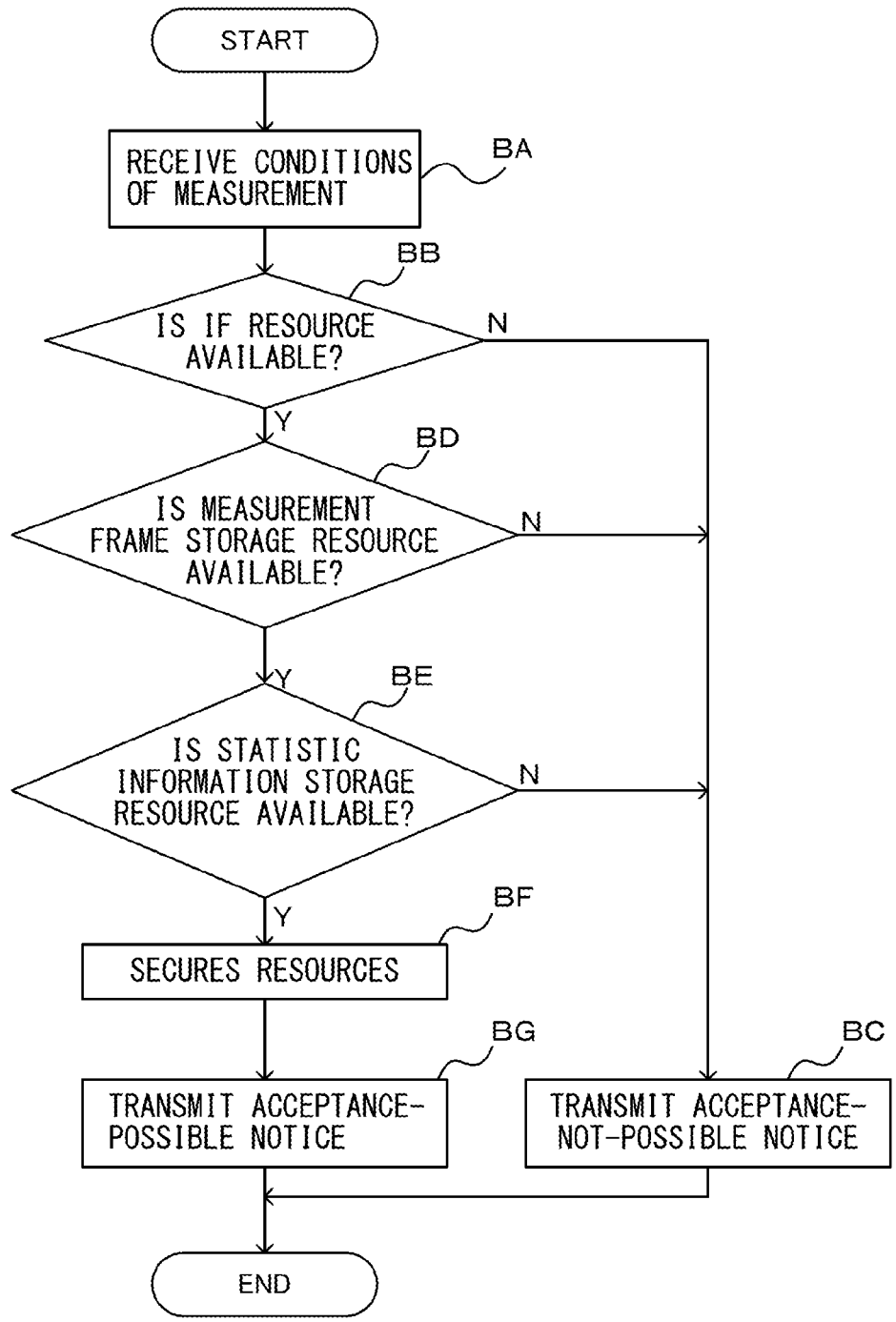
FIG. 20 is a diagram depicting an example of a resource securing operation in a communication device.
Figure 26:
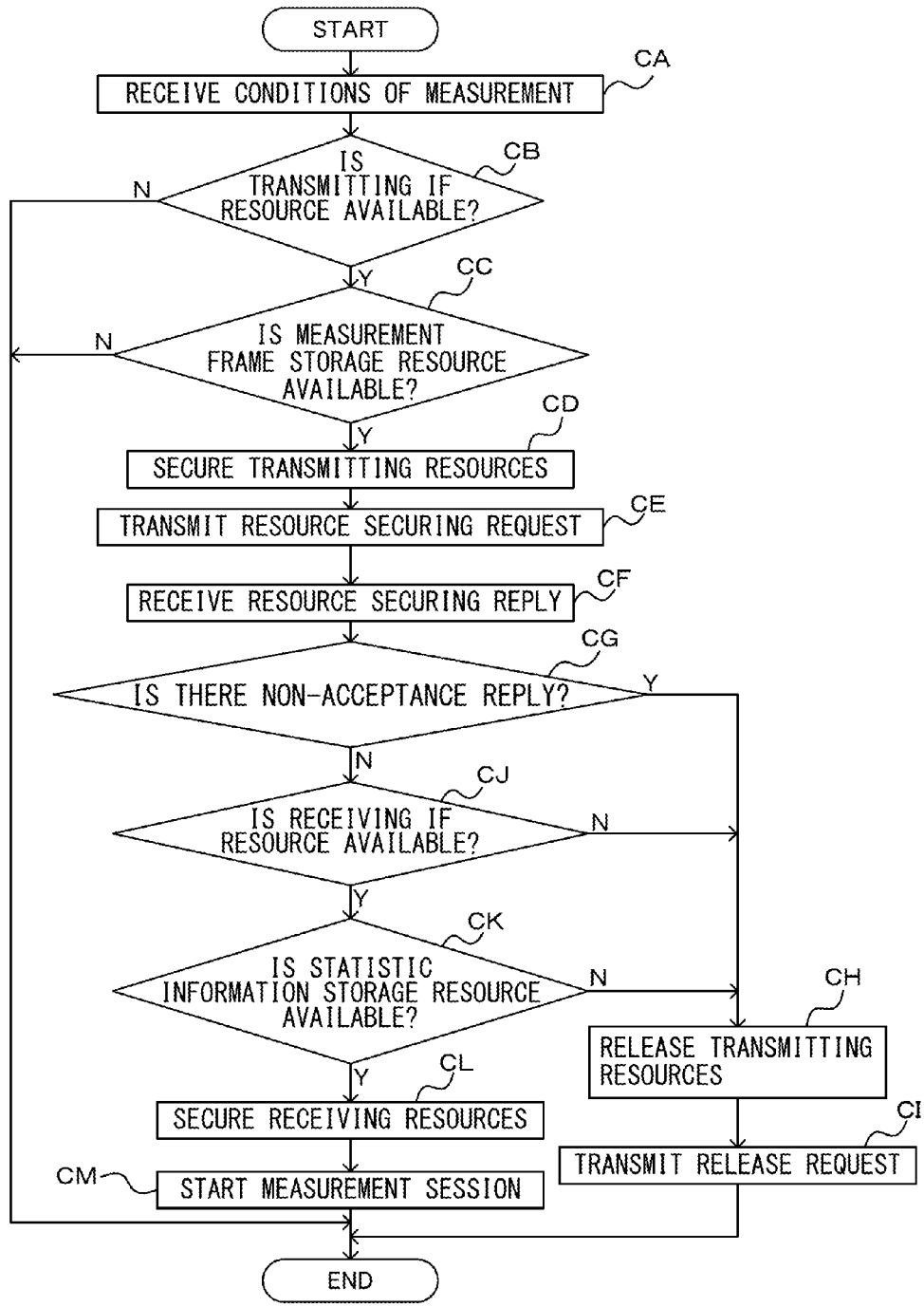
FIG. 26 is a diagram depicting an example of a measurement receiving operation in a communication device.
Figure 27:
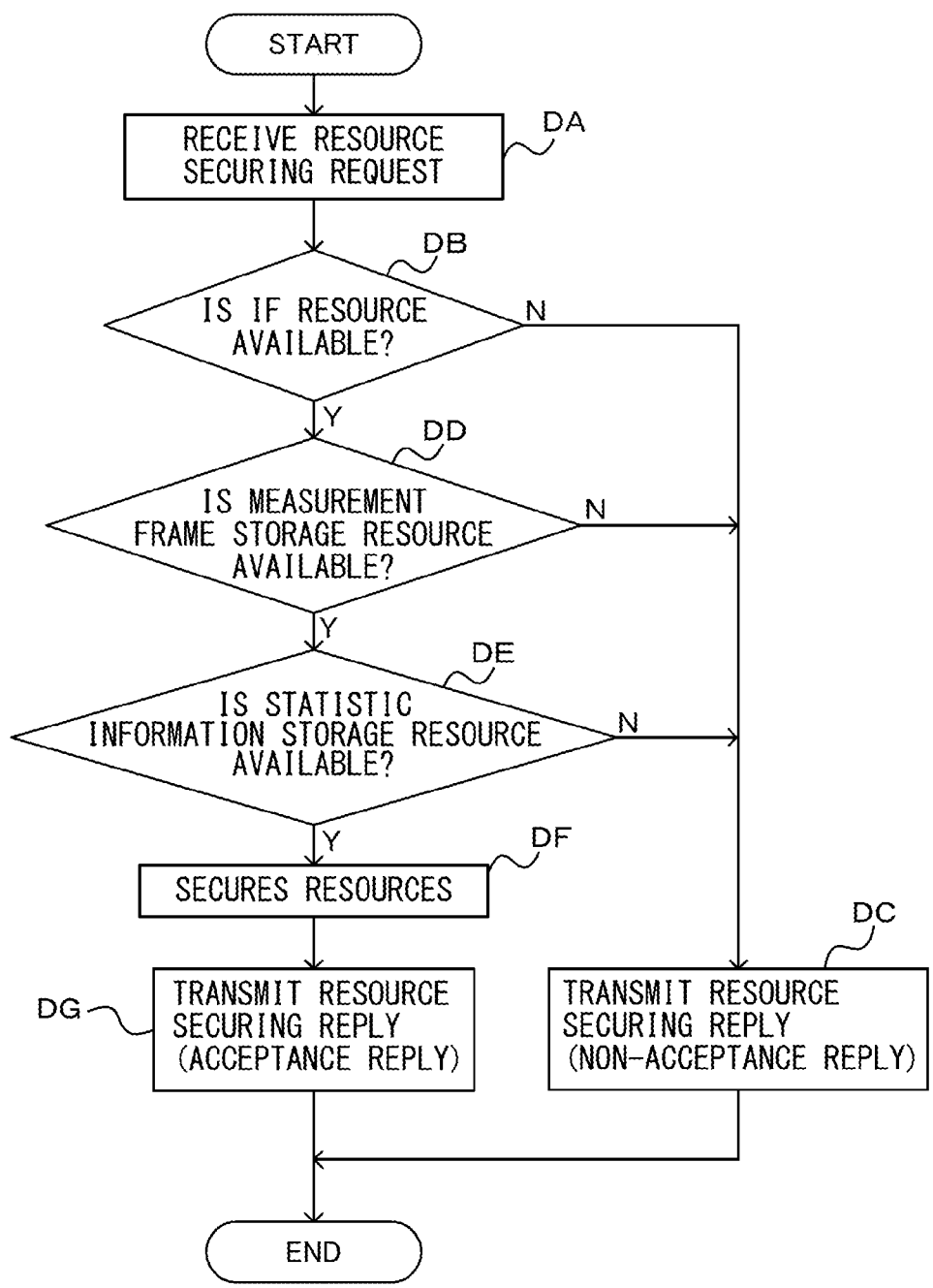
FIG. 27 is a diagram depicting an example of a measurement receiving operation in an opposing device.
Figure 28:
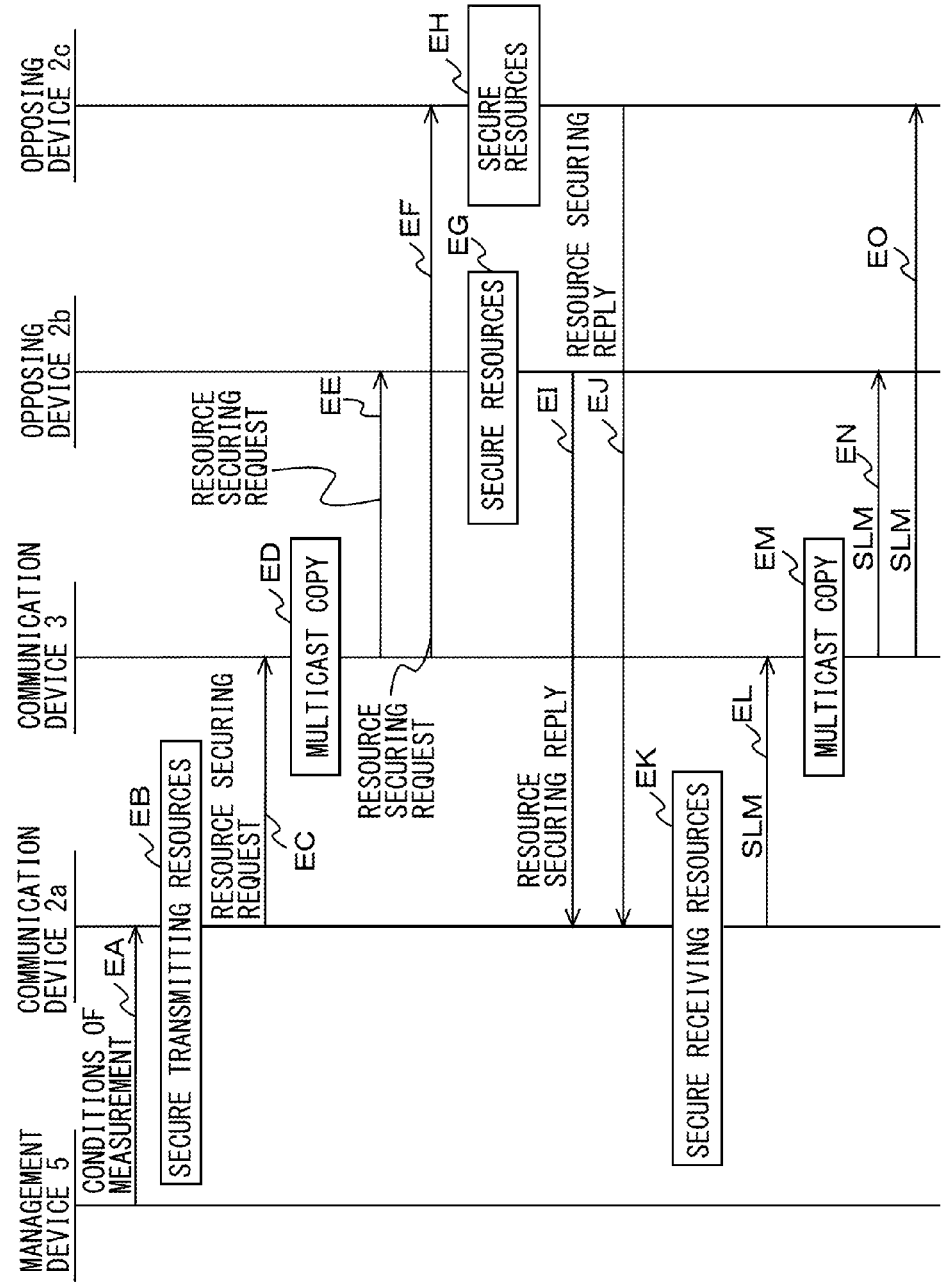
FIG. 28 is a diagram illustrating the second example of a frame loss measurement initiating operation.

The same applies to the operations depicted in FIG. 20 and in FIG. 26 to FIG. 28.

In operation AA, the management device 5 transmits the conditions of measurement of the frame loss measurement that is going to be started, to the opposing device 2b. In operation AB, the resource management unit 52 of the opposing device 2b secures the resources designated by the conditions of measurement for use in the frame loss measurement. FIG. 20 is a diagram depicting an example of the resource securing operation in the opposing device 2b.

In operation BA, the condition receiving unit 50 receives the conditions of measurement from the management device 5. In operation BB, the resource management unit 52 calculates the used bands of the transmitting IF 25 and receiving IF 26, used in frame loss measurement to comply with the conditions of measurement. In other words, when the SLM and SLR transmission intervals and the SLM and SLR frame size are designated in the conditions of measurement, it is possible to calculate the used bands from the products of the transmission intervals and the frame sizes.

The resource management unit 52 determines whether or not the calculated used bands of the transmitting IF 25 and the receiving IF 26 are equal to or lower than respective free capacities. When the used bands are equal to or lower than the free capacities and there are IF resources which can be used in the frame loss measurement (operation BB: Y), the operation proceeds to operation BD. When the used bands are greater than the free capacities and the IF resources which can be used in the frame loss measurement are short (operation BB: N), the operation proceeds to operation BC.

In operation BC, the acceptance determining unit 51 determines that frame loss measurement to comply with the conditions of measurement is not possible. The acceptance determining unit 51 transmits an acceptance-not-possible notice to the management device 5. After this, the operation is finished.

In operation BD, the resource management unit 52 determines whether or not a free capacity to store information used to generate SLRs that are going to be used newly, is available in the measurement frame storage memory 43. When the free capacity is available (operation BD: Y), the operation proceeds to operation BE. When the free capacity is not available (operation BD: N), the operation proceeds to operation BC.

In operation BE, the resource management unit 52 determines whether or not a free capacity to store the frame loss measurement results newly is available in the statistic information storage memory 45. When the free capacity is available (operation BE: Y), the operation proceeds to operation BF. When the free capacity is not available (operation BE: N), the operation proceeds to operation BC.

In operation BF, the resource management unit 52 secures the resources to be used in the frame loss measurement. In operation BG, the acceptance determining unit 51 determines that frame loss measurement to comply with the conditions of measurement is possible. The acceptance determining unit 51 transmits an acceptance-possible notice to the management device 5. After that, the operation is finished.

Reference will be made to FIG. 19. In this example, a case will be assumed where the resource management unit 52 successfully secures resources. In operation AC, the acceptance determining unit 51 transmits an acceptance-possible notice to the management device 5. When an acceptance-possible notice is received from the opposing device 2b, in operation AD, the management device 5 transmits the conditions of measurement for the frame loss measurement, to the communication device 2a. On the other hand, when an acceptance-not-possible notice is received from the opposing device 2b, the management device 5 does not transmit the conditions of measurement to the communication device 2a.

In operation AE, the resource management unit 72 of the communication device 2a secures the resources designated by the conditions of measurement for use in the frame loss measurement. The resource securing operation by the communication device 2a is to be the same as the resource securing operation depicted in FIG. 20. However, when frame loss measurement to comply with the conditions of measurement is possible, the measurement session management unit 63 of the communication device 2a starts a measurement session in accordance with the designated conditions of measurement. The transmissions of an acceptance-possible notice and an acceptance-not-possible notice by the communication device 2a may be omitted.

In the present example, a case will be assumed where the resource management unit 72 successfully secures resources. In operation AF, the measurement session management unit 63 starts a measurement session in accordance with the designated conditions of measurement, and, as a result, SLM transmission starts.

1.7 Effect of Embodiment

According to the present embodiment, after inner resources of the communication device 2a and the opposing devices 2 to be used for frame loss measurement are secured, it is possible to execute frame loss measurement. Consequently, the loss of SLMs and SLRs in the communication device 2a and the opposing devices 2 is reduced. As a result, the measurement error of communication path performance due to the loss of SLMs and SLRs inside the communication device 2a and the opposing devices 2 is reduced.

When SLMs are transmitted by multicast transmission, there is a concern that, in the communication device 2a, which receives SLRs from a plurality of opposing devices 2b and 2c, the communication band of the receiving IF runs short due to reception of a plurality of SLRs at the same time, and frame loss of the SLRs might occur. Furthermore, when the same communication device operates as a plurality of opposing devices 2b, there is also a concern that the communication band of the receiving IF runs short due to reception of a plurality of SLMs at the same time, and frame loss of the SLMs might occur. With the present embodiment, resources used for frame loss measurement can be secured, and, thereby, the frame loss of SLMs and SLRs is reduced.

2. Second Embodiment

Next, another embodiment of the communication system 1 will be illustrated. The opposing devices 2b and 2c according to the present embodiment receive information about the conditions of measurement from the communication device 2a. The communication device 2a stores information about the conditions of measurement in the Flags field of SLMs and transmits them to the opposing devices 2b and 2c, thereby making a request to secure resources for performing frame loss measurement to comply with the conditions of measurement. In the following description and accompanying drawings, an SLM to store information about the conditions of measurement may be referred to as a "resource securing request."

The opposing devices 2b and 2c determine whether or not frame loss measurement to comply with the conditions of measurement is possible, and, when it is possible, resources to be used for the frame loss measurement are secured. To answer the resource securing request, the opposing devices 2b and 2c store the decision results in the Flags field of the SLRs, which results are transmitted to the communication device 2a. When measurement is possible in all of the opposing devices 2b and 2c, the communication device 2a starts a measurement session. In the following description and accompanying drawings, an SLR transmitted in response to a resource securing request may be referred to as a "resource securing reply".

With the present embodiment, in a communication system by which frame loss measurement is performed on a point-to-multi-point basis, resource securing requests are transmitted by multicast transmission to a plurality of opposing devices 2b and 2c. The multicast transmission is realized by a multicast copy process on the communication path, and, thereby, making reference whether or not frame loss measurement is possible with respect to the plurality of opposing devices 2b and 2c and making a request to secure resources become more simple. Note that, in other embodiments, the communication device 2a may store and transmit information about the conditions of measurement in a multicast frame other than an SLM.

Figure 21:
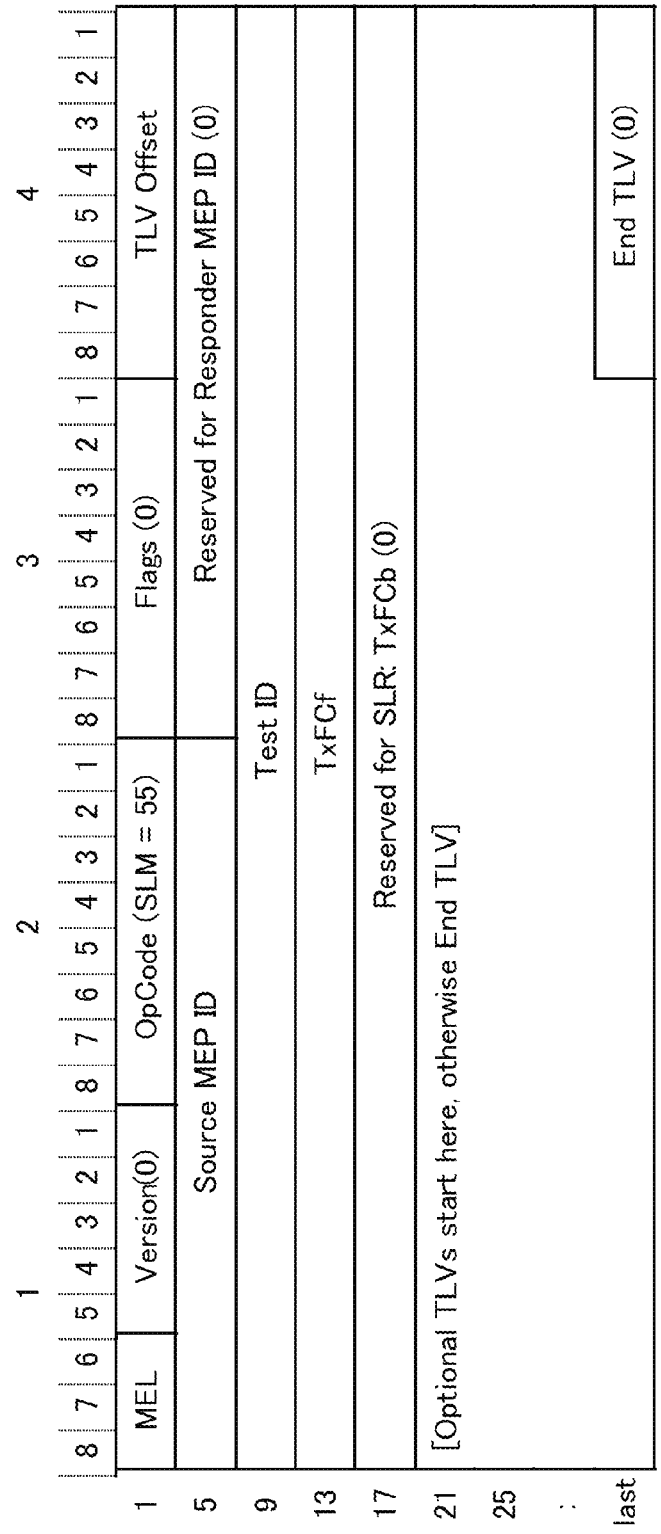
FIG. 21 is a diagram illustrating an SLM protocol data unit format.

FIG. 21 is a diagram illustrating an SLM PDU format. The SLM PDU includes an MEL field, a Version field, an OpCode field, a Flags field, a TLV Offset field, a Source MEP ID field, a Test ID field, a TxFCf field, an End TLV field, and a reserved area. The MEL field indicates the MEG level, which indicates the range of the network maintained and managed by the measurement session. The Version field indicates the OAM protocol version. The value of the OpCode field is set at "55".

Figure 22:
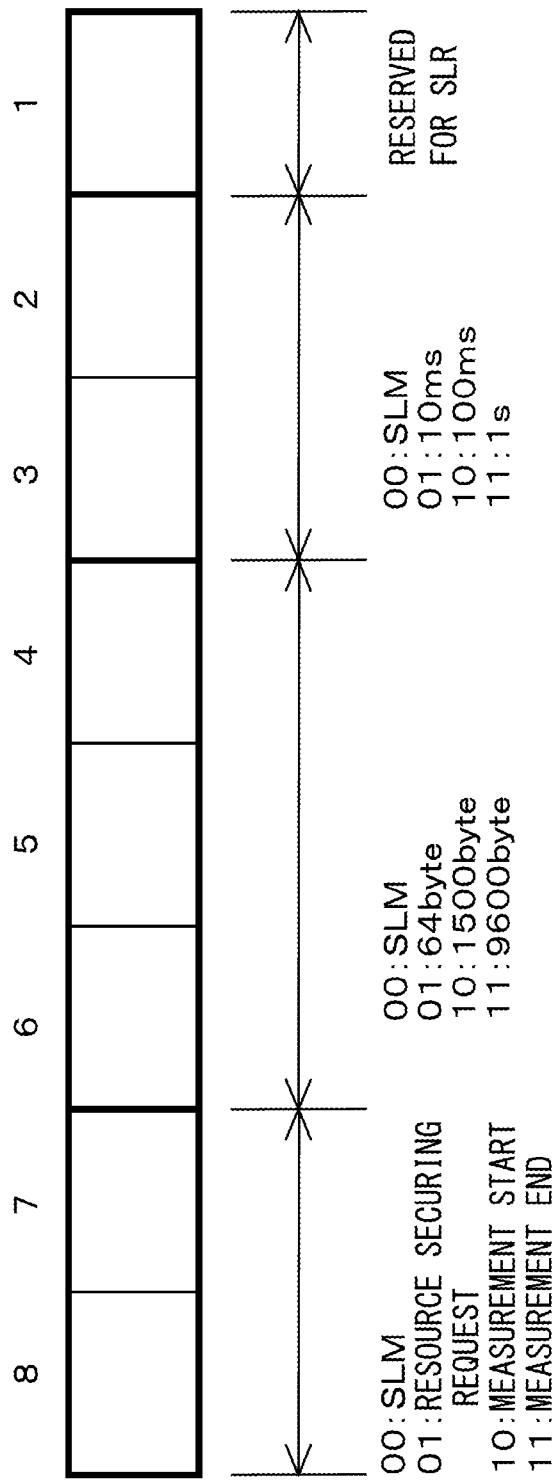
FIG. 22 is a diagram illustrating an example of use of an SLM Flags field.

The Flags field indicates flag information which can be set in the SLM PDU. FIG. 22 is a diagram illustrating an example of use of the Flags field of SLMs. Note that the bits of the Flags field of SLMs, not including the conditions of measurement transmitted during frame loss measurement, are all set at "0". The first bit is reserved to be used for the resource securing replies transmitted from the opposing devices 2b and 2c. The second and third bits are used to designate the SLM transmission interval, as a condition of measurement. The values "01", "10" and "11" indicate "10 ms", "100 ms" and "1 s", respectively.

The fourth to sixth bits are used to designate the SLM frame size as a condition of measurement. The values "01", "10" and "11" indicate "64 bytes", "1500 bytes" and "9600 bytes", respectively. The eighth and seventh bits indicate the type of the SLM PDU. The value "01" indicates a resource securing request. The value "10" indicates the SLM transmitted first in measurement. The value "10" indicates the SLM transmitted the last in measurement.

Reference will be made to FIG. 21. The value of the TLV Offset field is set at "16". The source MEP ID field indicates the identifier of the communication device 2a. The Test ID field indicates the identifiers of a plurality of tests that are executed at the same time. The TxFCf field indicates the count of SLM transmissions TxFCf[t] at the time of SLM transmission t. The value of the End TLV field is set at "0".

Figure 23:
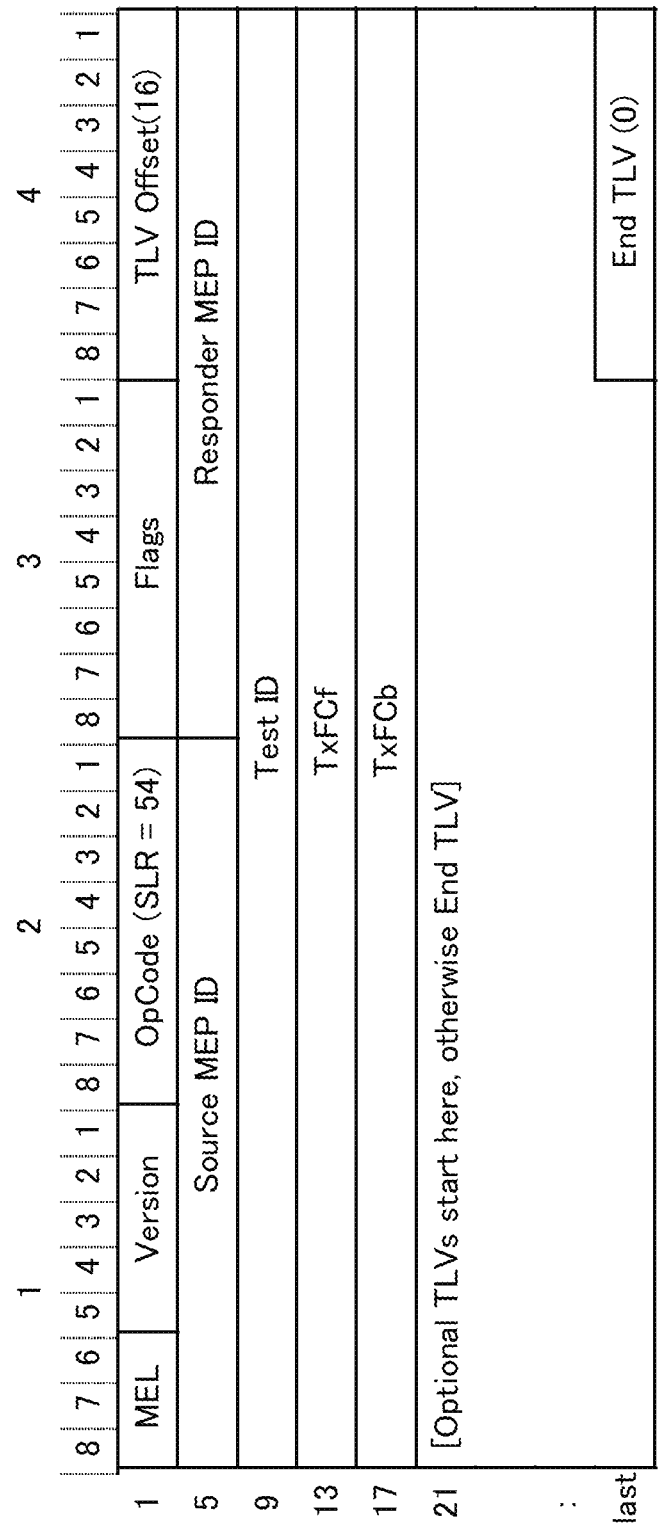
FIG. 23 is a diagram illustrating an SLR protocol data unit format.

FIG. 23 is a diagram illustrating an SLR PDU format. The SLR PDU includes an MEL field, a Version field, an OpCode field, a Flags field, a TLV Offset field and a Source MEP ID field. Furthermore, the SLR PDU includes a Responder MEP ID field, a Test ID field, a TxFCf field, a TxFCb field, an End TLV field and a reserved area.

The contents of the MEL field, the Version field, the TLV Offset field, the Source MEP ID field, the Test ID field and the End TLV field are the same as the case of the SLM PDU. The value of the OpCode field is set at "54". The Responder MEP ID field indicates the identifier of the opposing device 2b or 2c, which transmitted an SLR. The value of the TxFCf field is a value that is copied from the TxFCf field of the SLM corresponding to the SLR. The TxFCb field indicates the count of SLR transmissions TxFCb[t] at the time t when the SLR is transmitted.

Figure 24:
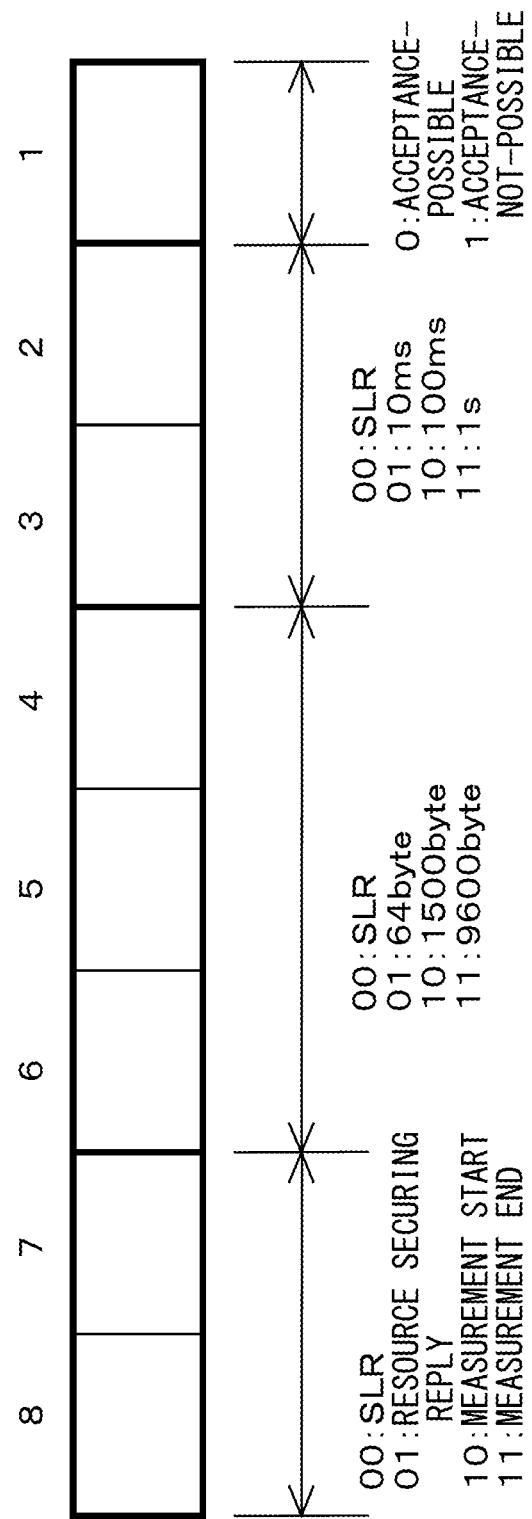
FIG. 24 is a diagram illustrating an example of use of an SLR Flags field.

FIG. 24 is a diagram illustrating an example of use of the Flags field of the SLR. For the values of the second to eighth bits, values copied from the SLM are set. The first bit is used to designate whether or not frame loss measurement to comply with the conditions of measurement is possible, in a resource securing reply. When frame loss measurement to comply with the conditions of measurement can be accepted, the value is set at "0". When frame loss measurement to comply with the conditions of measurement is not to be accepted, the value is set at "1". In the following description and accompanying drawings, resource securing replies, of which value of the first bit is "0" and "1," may be described as an "acceptance-possible reply" and an "acceptance-not-possible reply," respectively.

The functions of the communication device 2a according to the second embodiment will be illustrated with reference to the functional configuration diagram of FIG. 13. When the condition receiving unit 70 of the communication device 2a receives the conditions of measurement, the acceptance determining unit 71 makes reference to the resource management unit 72 whether or not the resources used to transmit SLMs in accordance with the designated conditions of measurement can be secured from the amounts of free resources in the transmitting IF 25 and the measurement frame storage memory 64.

When resources used to transmit SLMs are not to be secured, the acceptance determining unit 71 transmits an acceptance-not-possible notice to the management device 5. When resources used to transmit SLMs can be secured, the resource management unit 72 secures the resources for SLM transmission. The acceptance determining unit 71 commands the measurement session management unit 63 to transmit a resource securing request.

In response to the command from the acceptance determining unit 71, the measurement session management unit 63 commands the measurement frame processing unit 62 to generate and transmit a resource securing request. The measurement frame processing unit 62 transmits the resource securing request to store the Flags field in which the values to designate the conditions of measurement are set, as a multicast frame.

The measurement session management unit 63 reports the reception results of the resource securing replies transmitted from the opposing devices 2b and 2c to the acceptance determining unit 71. When the resource securing replies from all of the opposing devices 2b and 2c are acceptance-possible replies, the acceptance determining unit 71 makes reference to the resource management unit 72 whether or not resources used to receive SLRs from all of the opposing devices 2b and 2c in accordance with the designated conditions of measurement can be secured.

The resource management unit 72 multiplies the used band of the receiving IF 26 per single opposing device, by the number of opposing devices to transmit SLRs, and calculates the used resources of the receiving IF 26 for receiving SLRs. Furthermore, the resource management unit 72 multiplies the amount of use of the statistic information storage memory 66 per single opposing device, by the number of opposing devices to transmit SLRs, and calculates the amount of use of the statistic information storage memory 66 for receiving SLRs. The resource management unit 72 determines whether or not it is possible to secure resources for the number of opposing devices to transmit SLRs from the amounts of free resources of the receiving IF 26 and the statistic information storage memory 66.

When resources used to receive SLRs is not to be secured, the resource management unit 72 releases the resources secured to transmit SLMs. The acceptance determining unit 71 commands the measurement session management unit 63 to transmit resource release requests, to the opposing devices 2b and 2c, in order to release the resources secured by the opposing devices 2b and 2c in response to the resource securing requests. In response to the command from the acceptance determining unit 71, the measurement session management unit 63 commands the measurement frame processing unit 62 to generate and transmit a resource release request.

When resources used to receive SLRs can be secured, the resource management unit 72 secures resources for receiving SLRs. The measurement session management unit 63 starts a measurement session in accordance with the designated conditions of measurement.

Figure 25:
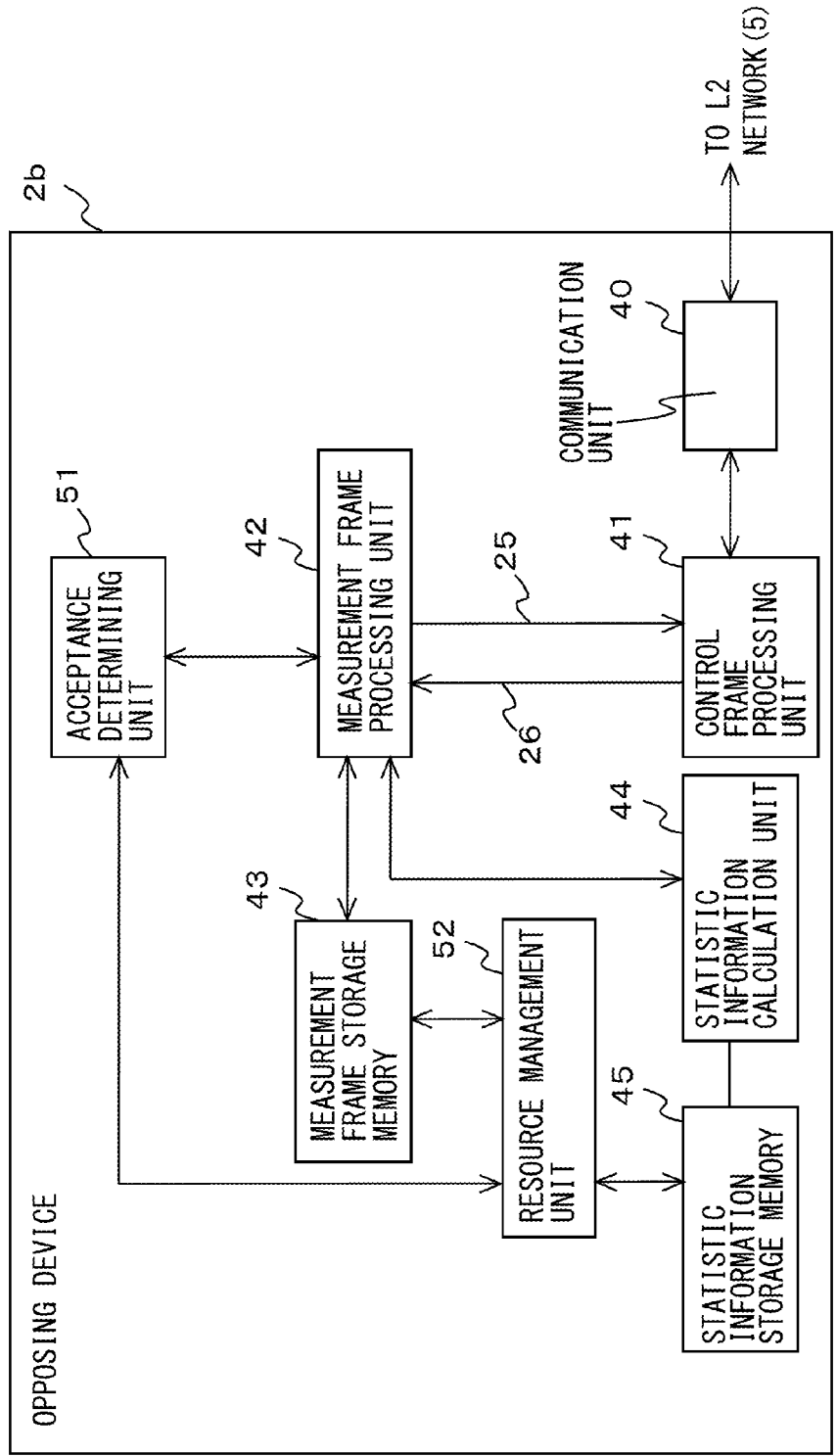
FIG. 25 is a diagram depicting the second example of a functional configuration of an opposing device.

Next, the functions of the opposing devices 2b and 2c will be illustrated. FIG. 25 is a diagram depicting a second example of a functional configuration of the opposing device 2b. The functions of the opposing devices 2c are also the same. The opposing device 2b according to the second embodiment may omit the condition receiving unit 50, which the opposing device 2b of the first embodiment uses to receive the conditions of measurement, because the opposing devices 2b receive SLMs including the conditions of measurement.

When the opposing device 2b receives the resource securing request, the acceptance determining unit 51 acquires the conditions of measurement set in the Flags field of the resource securing request. The acceptance determining unit 51 makes reference to the resource management unit 52 whether or not it is possible to secure resources designated by the conditions of measurement from the amounts of free resources of the transmitting IF 25, the receiving IF 26, the measurement frame storage memory 43 and the statistic information storage memory 45.

When the resource management unit 52 is able to secure resources, the acceptance determining unit 51 commands the measurement frame processing unit 42 to transmit an acceptance-possible reply. The measurement frame processing unit 42 transmits a resource securing reply, in which the first bit of the Flags field is set to "0" to the communication device 2a. When the resource management unit 52 is not able to secure resources, the acceptance determining unit 51 commands the measurement frame processing unit 42 to transmit an acceptance-not-possible reply. The measurement frame processing unit 42 transmits the resource securing reply, in which the first bit of the Flags field is set to "1" to the communication device 2a.

When the opposing device 2b receives a resource release request after having transmitted an acceptance-possible reply, the acceptance determining unit 51 commands the resource management unit 52 to release the resources. The resource management unit 52 releases the resources secured when the acceptance-possible reply was transmitted.

Next, the operations of the communication devices 2a and the opposing device 2b according to the second embodiment will be illustrated. FIG. 26 is a diagram depicting an example of a frame loss measurement acceptance operation in the communication device 2a. In operation CA, the condition receiving unit 70 receives the conditions of measurement from the management device 5.

In operation CB, the resource management unit 72 determines whether or not resources of the transmitting IF 25 for transmitting SLMs in accordance with the designated conditions of measurement can be secured. When resources can be secured (operation CB: Y), the operation proceeds to operation CC. When resources are not to be secured (operation CB: N), the operation is finished. In operation CC, the resource management unit 72 determines whether or not a free capacity to store the information used to generate SLMs that are going to be newly used is available in the measurement frame storage memory 64. When the free capacity is available (operation CC: Y), the operation proceeds to operation CD. When the free capacity is not available (operation CC: N), the operation is finished.

In operation CD, the resource management unit 52 secures resources for SLM transmission. In operation CE, the measurement session management unit 63 transmits a resource securing request as a multicast frame. In operation CF, the measurement session management unit 63 receives resource securing replies from the opposing devices 2b and 2c. The measurement session management unit 63 reports the reception result of the resource securing replies to the acceptance determining unit 71.

In operation CG, the acceptance determining unit 71 determines whether or not there is an acceptance-not-possible reply among the resource securing replies received. When there is an acceptance-not-possible reply (operation CG: Y), the operation proceeds to operation CH. When there is no acceptance-not-possible reply (operation CG: N), the operation proceeds to operation CJ.

In operation CH, the resource management unit 52 releases the resources for SLM transmission secured in operation CD. In operation CI, the measurement session management unit 63 transmits resource release requests to the opposing devices 2b and 2c which have transmitted the resource securing replies. After that, the process is finished.

In operation CJ, the resource management unit 72 determines whether or not resources of the receiving IF 26 for receiving SLRs in accordance with the designated conditions of measurement can be secured. When resource can be secured (operation CJ: Y), the operation proceeds to operation CK. When resources is not to be secured (operation CJ: N), the operation proceeds to operation CH. In operation CK, the resource management unit 72 determines whether or not a free capacity to store the frame loss measurement results newly is available in the statistic information storage memory 66. When a free capacity is available (operation CK: Y), the operation proceeds to operation CL. When a free capacity is not available (operation CK: N), the operation proceeds to operation CH.

In operation CL, the resource management unit 72 secures resources for receiving SLRs. In operation CM, the measurement session management unit 63 starts a measurement session in accordance with the designated conditions of measurement.

FIG. 27 is a diagram depicting an example of a frame loss measurement acceptance operation in the opposing device 2b. In operation DA, the measurement frame processing unit 42 receives a resource securing request. In operation DB, the resource management unit 52 determines whether or not IF resources of the transmitting IF 25 and the receiving IF 26 for transmitting SLMs and receiving SLRs in accordance with the conditions of measurement designated in the resource securing request can be secured. When IF resources can be secured (operation DB: Y), the operation proceeds to operation DD. When IF resources are not to be secured (operation DB: N), the operation proceeds to operation DC. In operation DC, the acceptance determining unit 51 transmits an acceptance-not-possible reply to the communication device 2a. After that, the operation is finished.

In operation DD, the resource management unit 52 determines whether or not a free capacity to store information used to generate SLRs that are going to be used newly, is available in the measurement frame storage memory 43. When the free capacity is available (operation DD: Y), the operation proceeds to operation DE. When the free capacity is not available (operation DD: N), the operation proceeds to operation DC.

In operation DE, the resource management unit 52 determines whether or not a free capacity to store the frame loss measurement results newly is available in the statistic information storage memory 45. When the free capacity is available (operation DE: Y), the operation proceeds to operation DF. When the free capacity is not available (operation DE: N), the operation proceeds to operation DC.

In operation DF, the resource management unit 52 secures resources to be used in frame loss measurement. In operation DG, the acceptance determining unit 51 transmits an acceptance-possible reply to the communication device 2a. After that, the operation is finished.

Next, the operations of the management device 5, the communication device 2a and the opposing device 2b at the start of frame loss measurement according to the second embodiment will be illustrated with reference to FIG. 28. In operation EA, the management device 5 transmits the conditions of measurement of the frame loss measurement that is going to be started, to the communication device 2a. In operation EB, the resource management unit 72 of the communication device 2a secures resources for the transmitting IF 25 and measurement frame storage memory 64 to be used in the frame loss measurement.

In operation EC, the measurement session management unit 63 transmits a resource securing request as a multicast frame. In operation ED, the communication device 3 on the path between the communication device 2a and the opposing devices 2b and 2c, multicast-copies the resource securing request. In operations EE and EF, the communication device 3 transmits resource securing requests to the opposing devices 2b and 2c.

In operations EG and GH, the resource management unit 52 of the opposing devices 2b and 2c secures resources to be used for the frame loss measurement. When resources are successfully secured, in operations EI and EJ, the resource management units 52 of the opposing devices 2b and 2c transmits resource securing replies to the communication device 2a.

In operation EK, the resource management unit 72 of the communication device 2a secures resources of the receiving IF 26 and the statistic information storage memory 66 used for the frame loss measurement. In operation EL, the measurement session management unit 63 starts a measurement session in accordance with the designated conditions of measurement. As a result, the transmission of SLMs is started. In operation EM, the communication device 3 multicast-copies an SLM. In operations EN and EO, the communication device 3 transmits SLMs to the opposing devices 2b and 2c respectively.

With the present embodiment, it is possible to use multicast transmission to make reference whether or not frame loss measurement is possible with respect to a plurality of opposing devices and to make a request to secure resources. Consequently, compared to separately executing processes for a plurality of opposing devices, the load on the device to perform the process of making reference whether or not measurement is possible and the process of making a request to secure resources is reduced. Note that the present embodiment is applicable to either case where communication devices and opposing devices perform frame loss measurement on a point-to-point basis and on a point-to-multiple point basis.

According to the device and method disclosed herein, measurement error of communication path performance due to measurement frame loss in communication devices is eliminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A frame loss measurement device, comprising:
a receiver configured to receive a measurement frame for measuring a communication path from an opposing device;
a processor configured to measure performance of the communication path where the measurement frame is transmitted based on the measurement frame received; and
a transmitter configured to transmit, to the opposing device, a resource securing request signal to request to secure resources of the opposing device to allocate to a request frame to request the measurement frame, and transmit the request frame to request the measurement frame to the opposing device;

wherein, after the resources of the opposing device to allocate to the request frame are secured, the processor secures resources of the frame loss measurement device to allocate to the measurement frame to be received and then starts transmitting the request frame to request the measurement frame to the opposing device.

2. The frame loss measurement device according to claim 1, wherein the request frame is a multicast frame which is transmitted to a plurality of opposing devices; and the transmitter starts transmitting the request frame after the resources of the frame loss measurement device to allocate to measurement frames to be transmitted from the plurality of opposing devices are secured.

3. The frame loss measurement device according to claim 1, wherein the resource securing request signal comprises information about measurement conditions for the measurement of the communication path.

4. The frame loss measurement device according to claim 1, wherein the resource securing request signal is a request frame including a flag to identify a frame to be used as a resource securing request signal.

5. The frame loss measurement device according to claim 1, wherein the request frame and the measurement frame are measurement frames to be used to measure the number of frame losses on the communication path.

6. A performance measurement method for measuring performance of a communication path between a frame loss measurement device and an opposing device, the method comprising:

transmitting, by the frame loss measurement device, a resource securing request signal to request to secure resources of the opposing device to allocate to a request frame to request a measurement frame;

securing, by the frame loss measurement device, resources of the frame loss measurement device to allocate to the measurement frame after securing, by the opposing device, the resources of the opposing device to allocate to the request frame; and transmitting, by the frame loss measurement device, a request frame to request the measurement frame to the opposing device, receiving a measurement frame from the opposing device, and measuring performance of the communication path where the measurement frame is transmitted based on the measurement frame received.

7. A performance measurement method for measuring performance of a communication path between a frame loss measurement device and an opposing device, the method comprising:

transmitting, by a management device, conditions of measurement for measuring the frame loss to the opposing device;

determining, by the opposing device, whether or not resources of the opposing device are secured according to the conditions of measurement;

transmitting, by the management device, the conditions of measurement for measuring the frame loss to the frame loss measurement device when the resources of the opposing device are secured;

determining, by the frame loss measurement device, whether or not resources of the frame loss measurement device are secured according to the conditions of measurement; and starting measurement of performance of the communication path between the frame loss measurement device and the opposing device when the resources of the frame loss measurement device are secured.

* * * * *